US012456010B2

(12) United States Patent
Srinivasamoorthy et al.

(10) Patent No.: US 12,456,010 B2
(45) Date of Patent: Oct. 28, 2025

(54) PREDICTING TEXT AND DATA VARIABLES USING CUSTOMER-SPECIFIC MODELS

(71) Applicant: Oracle International Corporation, Redwood Shores, CA (US)

(72) Inventors: Arvind Srinivasamoorthy, Clarksburg, MD (US); Emma Jane Thomas, Reading (GB); Maximilian Froeschl, Munich (DE)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 562 days.

(21) Appl. No.: 17/853,684

(22) Filed: Jun. 29, 2022

(65) Prior Publication Data
US 2024/0005095 A1    Jan. 4, 2024

(51) Int. Cl.
*G06F 40/274*    (2020.01)
*G06F 16/335*    (2019.01)
(Continued)

(52) U.S. Cl.
CPC .......... *G06F 40/274* (2020.01); *G06F 16/335* (2019.01); *G06F 40/284* (2020.01); *G06F 40/56* (2020.01)

(58) Field of Classification Search
CPC ...... G06F 40/274; G06F 40/56; G06F 40/284; G06F 16/335
See application file for complete search history.

(56) References Cited

U.S. PATENT DOCUMENTS 6,651,217 B1 * 11/2003 Kennedy ............... G06F 40/174
715/224
9,807,037 B1    10/2017 Sapoznik et al.
(Continued)

FOREIGN PATENT DOCUMENTS

EP        3895082 A1    10/2021
WO   2019125615 A1     6/2019

OTHER PUBLICATIONS

"Customer Story: VodafoneZiggo", Available Online at: https://deepdesk.com/customer-stories/vodafoneziggo, 6 pages.
(Continued)

*Primary Examiner* — Daniel Samwel
(74) *Attorney, Agent, or Firm* — Kilpatrick Townsend & Stockton LLP

(57) ABSTRACT

A text prediction system for providing personalized text suggestions for different customers is disclosed. For a text message being composed via an application for an intended recipient, the system receives a portion of the text message based upon a current cursor position in the text message. The system identifies a customer associated with the intended recipient and identifies a customer-specific model for the customer. The system predicts text to be suggested for type-ahead insertion at the current cursor position using the customer-specific model and based upon the portion of the text message. The suggested text may include one or more data variables that are replaceable with values determined from data stored for the customer. The data variables provide further customization to the suggested text by presenting suggestions are more personalized for the recipient of the text message. The system causes the suggested text to be output via the application.

20 Claims, 16 Drawing Sheets

(51) Int. Cl.
*G06F 40/284* (2020.01)
*G06F 40/56* (2020.01)

(56) References Cited

U.S. PATENT DOCUMENTS

| | | | |
|---|---|---|---|
| 10,402,493 B2 | 9/2019 | Spencer et al. | |
| 10,594,757 B1* | 3/2020 | Shevchenko | G06F 17/18 |
| 2004/0039988 A1* | 2/2004 | Lee | G06F 40/274 |
| | | | 707/E17.107 |
| 2014/0163954 A1 | 6/2014 | Joshi et al. | |
| 2017/0300477 A1* | 10/2017 | Long | G06F 16/22 |
| 2018/0101599 A1* | 4/2018 | Arnold | G06F 40/274 |
| 2019/0163728 A1* | 5/2019 | Koren | G06N 5/01 |
| 2021/0319178 A1 | 10/2021 | Zhang | |
| 2021/0374360 A1* | 12/2021 | Paul | G06F 40/56 |
| 2021/0390265 A1* | 12/2021 | Breber | G06F 3/0482 |

OTHER PUBLICATIONS

"Faster Agents, Happy Customers, Lower Cost", Available Online at: https://deepdesk.com/, 4 pages.
"Personal Collection", Available Online at: https://deepdesk.com/whats-new-in-march-2021, 2 pages.
"Quick Reply Substitution Variables", Available Online at: https://skyboxcommunications.com/skybox-six-documentation-root/special-features/quick-reply-substitution-variables/, Accessed from Internet on Jan. 25, 2022, 2 pages.
"Using Suggested Solutions", Available Online at: https://support.freshdesk.com/support/solutions/articles/37618-using-suggested-solutions, Nov. 5, 2020, 2 pages.
Bornstein-Hacohen, "This Week: Our New Autocomplete Feature and Facebook Pay Launch", Available Online at: https://www.conversocial.com/blog/conversation-round-up-26-november, 3 pages.
Daiminger, "Next Best Action Prediction with Text and Metadata: Building an Agent Assistant", Available Online at: https://towardsdatascience.com/next-best-action-prediction-with-text-and-metadata-building-an-agent-assistant-81117730be6b, Jul. 9, 2019, 7 pages.
Guevara, "Proposal Project: Prediction of the Next Word", Available Online at: https://rstudio-pubs-static.s3.amazonaws.com/72714_470e6d30786d4bb88c445311077390de.html, Accessed from Internet on Jan. 25, 2022, 9 pages.
Parkhurst, "Omnichannel for Customer Service—Quick Replies and Automated Messages", Available Online at: https://neilparkhurst.com/2020/09/27/omnichannel-for-customer-service-quick-replies-automated-messages/, Sep. 27, 2020, 13 pages.

\* cited by examiner

PREDICTING TEXT AND DATA VARIABLES USING CUSTOMER-SPECIFIC MODELS

BACKGROUND

The productivity of large entities such as organizations and enterprises can be significantly increased by effective communication with its customers. A customer service representative of an organization may typically engage in hundreds of interactions daily with its customers. A vast number of such communications are in the form of text messages, blogs and the like. Examples of text messages may include, for instance, email messages, SMS messages, editable documents, and the like. In order to enhance communications with a customer, it is desired that these text messages be personalized for a customer of the entity.

In most situations, the personalization is done manually. As a result, authoring or composing such messages is very labor intensive and time consuming. Some existing applications use templates, with different templates configured for different customers. While these templates offer some level of personalization such as for an opening greeting or a closing thanks, these templates are static and thus are limited in their ability to provide personalization. These templates also have to be pre-configured and "fixed" prior to use and typically do not dynamically adapt to changes in customer preferences as those preferences change over time. In the realm of digital assistants (e.g., chatbots), responsive to an utterance received from a user, a model (e.g., a machine learning model) may be used to infer an intent from the utterance, and a template for the response is then identified based upon the inferred intent. As such, these responses also suffer from the same shortcomings as discussed above for template usage. There is thus a need for making the processing, including personalization of text messages for customers, more efficient than is possible in existing implementations.

BRIEF SUMMARY

The present disclosure relates generally to techniques for generating personalized text suggestions for different customers. More specifically, but not by way of limitation, this disclosure describes a text prediction system that predicts text to be suggested for insertion at a current cursor position in a text message being composed via an application based upon a portion of the text message that is composed and based upon a customer-specific model identified for an intended recipient of the text message. The suggested text presents suggestions that are more personalized for the recipient of the text message. In certain examples, the suggested text additionally includes data variables that are replaceable with values determined from data stored for the customer.

Various embodiments of a text prediction system are disclosed. For a text message being composed via an application for an intended recipient, the system receives a portion of the text message based upon a current cursor position in the text message. The system identifies a customer associated with the intended recipient and identifies a customer-specific model for the customer. The system predicts text to be suggested for insertion at the current cursor position using the customer-specific model and based upon the portion of the text message. In certain examples, the suggested text may include a first data variable, where the first data variable is replaceable with a value determined from data stored for the customer. The system then causes suggested text to be output via the application.

In certain examples, the system determines, based upon one or more information sources storing the data associated with the customer, a first value for the first data variable in the suggested text and replaces the first data variable in the suggested text with the first value. The system then provides the suggested text with the first data variable replaced with the first value to the application. The application inserts the suggested text with the first data variable replaced with the first value into the text message at the current cursor position.

In certain examples, the system determines, based upon one or more information sources storing the data associated with the customer, a first value for the first data variable in the suggested text. The system then provides the suggested text comprising the first data variable and the first value determined for the first data variable to the application. The application receives an indication indicating selection of the suggested text for insertion at the current cursor position and causes the suggested text to be inserted at the current cursor position. The application then receives an indication of selection of the first value and replaces the first data variable in the suggested text inserted in the text message with the first value.

In certain examples, the application receives a signal to replace a set of one or more data variables present in the text message with their corresponding data values and communicates the set of one or more data variables to the text prediction system. The application receives from the system a set of values determined by the system for the set of one or more data variables and for each data variable in the set of one or more data variables, replaces the data variable with its corresponding value received by the application from the text prediction system.

In certain examples, the system receives the set of one or more data variables from the application and for each data variable in the set of one or more data variables, determines a value for the data variable using one or more information sources storing data associated with the customer. The system then communicates the set of values for the set of one or more data variables to the application.

In certain examples, the system identifies a first particular data acquisition technique to be used to obtain a value for a first particular data variable in the set of one or more data variables and uses the first particular data acquisition technique to determine the value for the first particular data variable.

In certain examples, the system identifies a second particular data acquisition technique to be used to obtain a value for a second particular data variable in the set of one or more data variables and uses the second particular data acquisition technique to determine the value for the second particular data variable. In certain examples, the first particular data acquisition technique is different from the second particular data acquisition technique.

In certain examples, the system identifies a first information source, from one or more information sources storing data associated with the customer, for obtaining a value for a first particular data variable in the set of one or more data variables and uses the first information source to determine the value for the first particular data variable. In certain examples, the system identifies a second information source, from one or more information sources storing data associated with the customer, for obtaining a value for a second particular data variable in the set of one or more data variables and uses the second information source to determine the value for the second particular data variable. In some examples, the first information source is different from the second information source.

In certain examples, the customer-specific model is trained using customer specific data associated with the customer and non-customer specific data. In certain examples, the first data variable is generated by a training system used by the text prediction system based at least in part on the customer specific data associated with the customer. In certain examples, the customer specific data comprises at least one of company specific terminology and information, product manuals or company specific Frequently Asked Questions (FAQs) associated with the customer. In certain examples, text message comprises an email message, a Short Message Service (SMS) or an editable document composed by a user for the intended recipient.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
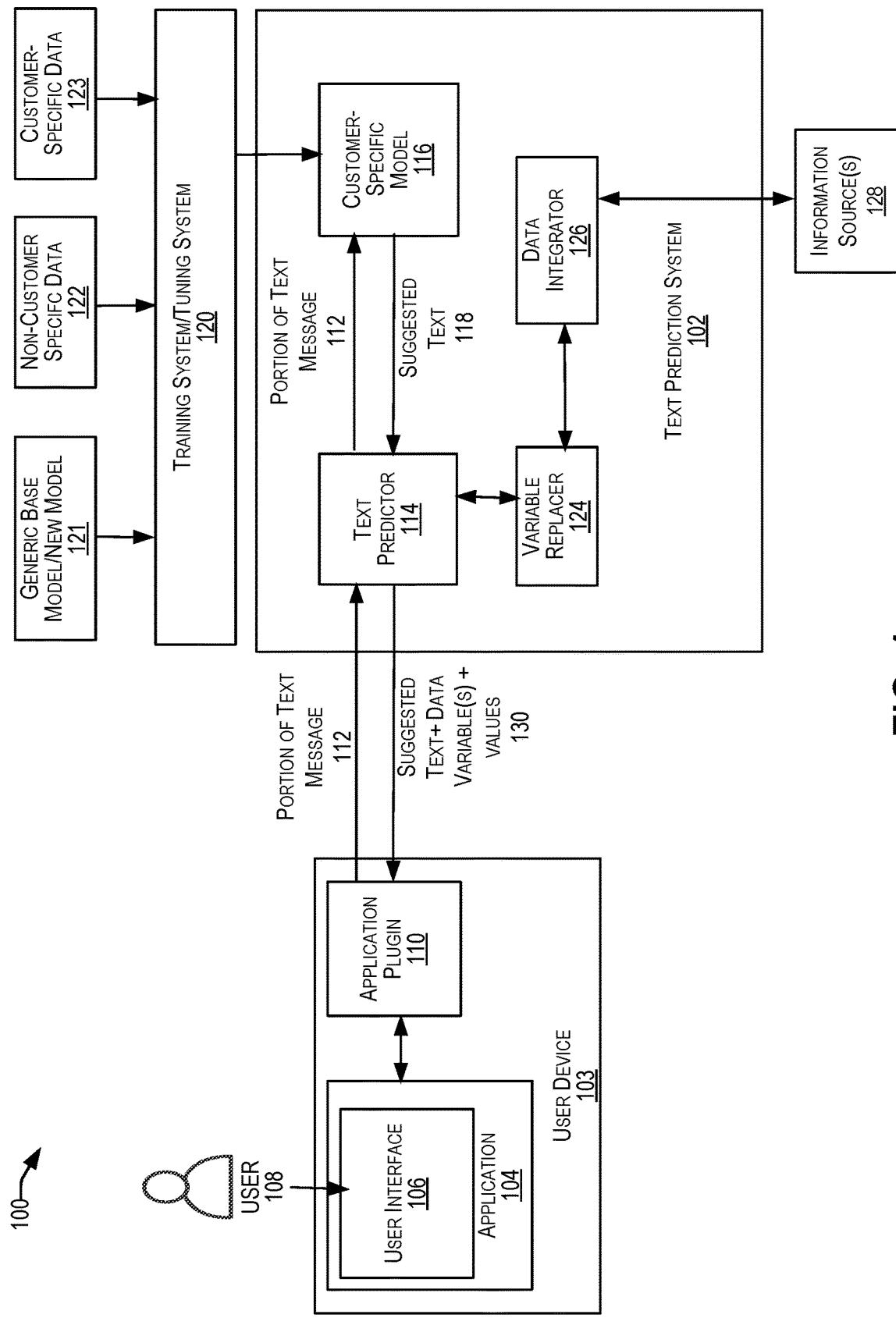
FIG. 1 depicts an example computing environment including a text prediction system that is configured to predict text to be suggested for insertion at a current cursor position in a text message being composed via an application, as disclosed herein according to certain embodiments.

The present disclosure relates generally to techniques for generating personalized text suggestions for different customers. More specifically, but not by way of limitation, this disclosure describes a text prediction system that predicts text to be suggested for insertion (e.g., type-ahead insertion) at a current cursor position in a text message being composed via an application based upon a portion of the text message that is composed and based upon a customer-specific model identified for an intended recipient of the text message. In certain examples, the suggested text additionally includes data variables that are replaceable with values determined from data stored for the customer.

The disclosed text prediction system includes capabilities for providing improved and higher levels of personalization of text messages directed to different customers than what is possible by conventional techniques. A customer can be a company or organization, a department within a company, or a group of users within a company. In certain implementations, different customer-specific models are generated for different customers, where a model for a specific customer is trained or tuned based upon customer-specific data associated with the customer. For example, a model A may be trained or tuned and generated for a Customer A, where the model A is trained or tuned using Customer A-specific data and a model B may be trained or tuned and generated for a Customer B, where the model B is trained or tuned using Customer B-specific data. For a text message that is composed for an intended recipient, a model that is specific to the customer associated with that recipient is identified, and the specific model is used to compose the personalized text message for the particular recipient. Customer-specific data for a customer may include, for instance, customer-specific information such as company specific terminology and information, such as, product manuals or company specific FAQs associated with the customer.

In certain implementations, as a text message is being composed (e.g., typed) by the author of the message for a recipient, a particular customer-specific model is identified by the text prediction system and used by the text prediction system to predict text to be suggested for insertion at a current cursor position in the text message. The disclosed text prediction system may additionally include capabilities to provide continuous type-ahead suggestions (i.e., suggested texts) for selection as the user composes a text message. For instance, for each cursor position of a text message being composed, the text prediction system may be configured to provide a different suggested text comprising different data variables. These suggestions are made seamlessly as the text message is being typed. In certain examples, the text prediction system may present multiple suggestions, and the user who is composing the text message can select a particular text suggestion to insert into the text message.

In certain embodiments, the suggested text that is predicted by the text prediction system may also include data variables, where a data variable can take one or more values. The data variables that are provided as part of the suggested text are specific to a particular customer associated with the intended recipient of the text message. For example, the data variables specific to a first customer (e.g., a customer A) may include the Customer Address, Ship Date or Ship Status whereas the data variables specific to a different customer (e.g., Customer B) may include a different set of data variables such as the Customer Name, Sell Date, Inventory Status, and so on.

In certain embodiments, the disclosed text prediction system provides the suggested text including the data variables via a user interface of an application used to compose the text message. For example, the suggested text generated for a customer A may be "Your order is currently $ShipStatus," where $ShipStatus represents the data variable predicted by the customer-specific model for the customer. The user interface displaying the suggested text including the data variables may additionally provide user-selectable options for selecting values to be fetched from backend information sources associated with the customer to be used to replace the variables in the suggested text. For instance, for the $ShipStatus data variable described above, the text prediction system may communicate with a shipping application associated with the customer to obtain a value for the $ShipStatus data variable. In the above example, the fetched value may be "shipped" and so the final suggested text portion may be "Your order is currently shipped."

Referring now to the drawings, FIG. 1 depicts an example computing environment 100 including a text prediction system 102 that is configured to predict text to be suggested for insertion at a current cursor position in a text message being composed via an application, as disclosed herein according to certain embodiments. The text prediction system 102 may be implemented by one or more computing systems. For example, the one or more computing systems may execute computer-readable instructions (e.g., code, program) to implement the text prediction system 102. As depicted in FIG. 1, the text prediction system 102 includes various subsystems including a text predictor 114, a customer-specific model 116, a variable replacer 124 and a data integrator 126. Portions of data or information used by or generated by the text prediction system 102 as part of its processing may be stored in a training system/tuning system 120 and one or more information sources 128. The systems and subsystems depicted in FIG. 1 may be implemented using only software (e.g., code, instructions, program) executed by one or more processing units (e.g., processors, cores) of a computing system, hardware, or combinations thereof. The software may be stored on a non-transitory storage medium (e.g., on a memory device).

The text prediction system 102 may be implemented in various different configurations. In certain embodiments, the text prediction system 102 may represent a computing system of an entity (for e.g., an organization, an enterprise, or an individual) that provides text prediction functionality to its users. In other embodiments, the text prediction system 102 may be implemented on one or more servers of a cloud provider network and its text prediction services may be provided to subscribers of cloud services on a subscription basis. The functionality to provide text predictions, as described in this disclosure, may be offered as part of the service. A customer can subscribe to the service to generate customized text predictions for its users. The service will generate the customized predictions and send them to the requesting subscriber. As part of generating the prediction, the service may also display the predicted text that is suggested to a user for type-ahead insertion at a current cursor position in the text message being composed by the user via a UI of a computing device of the requesting subscriber as described in this disclosure.

Computing environment 100 depicted in FIG. 1 is merely an example and is not intended to unduly limit the scope of claimed embodiments. One of ordinary skill in the art would recognize many possible variations, alternatives, and modifications. For example, in some implementations, the text prediction system can be implemented using more or fewer subsystems than those shown in FIG. 1, may combine two or more subsystems, or may have a different configuration or arrangement of subsystems.

As depicted in FIG. 1, a user 108 may interact with the text prediction system 102 using a user device 103 that is communicatively coupled to the text prediction system 102, possibly via one or more communication networks. For example, the user 108 may represent a customer service representative of the entity that provides text prediction functionality using the text prediction system 102 to its end-users (e.g., its various customers). The user device 103 may be of various types, including but not limited to, a mobile phone, a tablet, a desktop computer, and the like. The user 108 may interact with the text prediction system 102 using an application 104 executed by the user device 103. The application 104 may be any type of application (e.g., an enterprise application) used by the entity to communicate with their customers such as an email application, a fulfillment application, a shipping application, a manufacturing application and so on. The customer service representative may use the application 104 to type a text message to be sent to a recipient associated with the customer. In certain examples, the application 104 may vary based on geographic regions in which the entity operates in or may vary based on different products provided by the enterprise/entity.

In certain embodiments, the user 108 may use a user interface (UI) 106 (which may be a graphical user interface (GUI)) of the application 104 executed by the user device 103 to author (i.e., compose) a text message for an intended recipient. For example, the recipient may be an employee of a particular company or an organization who is a customer of the entity that implements the text prediction system. For a text message that is an email message, the recipient may be determined based on the "to" field of the email message. A text message may include a set of words/phrases, one or more sentences, one or more paragraphs, and the like. The text message may represent an email message, a Short Message Service (SMS), an editable document (e.g., a Word® template or a text editable PDF) and so on that may be composed by a customer service representative (e.g., 108) of the entity. In certain examples, the text message may be directed to a recipient associated with the customer to provide information to the recipient regarding the recipient's order, shipping dates or availability status of a spare part, and the like. In certain examples, the format and content of messages sent by the customer service representative may be different based upon the customer's loyalty tier. In certain cases, the text message to be sent to the recipient may be authored by the customer service representative in response to an original query (e.g., requesting status) sent by the recipient to the customer service representative.

As shown in FIG. 1, a user 108 may compose a text message via an application 104. Based upon a current position of a cursor in the text message being composed by the user, an application plug-in 110 (i.e., a piece of software or program that provides additional functionality to the application 104) determines a portion of the text message to be selected and transmits the selected portion of the text message 112 to the text prediction system 102 for analysis. The portion of the text message that is selected may include the previous 'n' words from the current cursor position. The number (n) of words may be a configurable value that is determined by an administrator of the application. In certain embodiments, the UI 106 within the application 104 may itself be configured with the functionality to determine a portion of the text message to be selected for analysis. Upon selecting the portion of the text message, the UI can directly then transmit the portion of the text message 112 to the text prediction system 102 for analysis.

The text prediction system 102 performs processing (analysis) to predict text to be suggested for insertion (i.e., type-ahead insertion) at the current cursor position based upon the portion of the text message 112 and using a customer-specific model identified for the customer associated with the intended recipient. The results of the processing performed by the text prediction system 102 are then communicated back to the application plugin 110 in the user device. These results 130 may include predicted text that is suggested for insertion at the current cursor position. For different cursor positions, the results 130 of the processing performed by the text prediction system may provide different suggested texts. The suggested text that is provided to the user is relevant to the portion of the text message composed by the user and is also relevant to the recipient of the message. In some examples, the results 130 may additionally include data variables and data variable values associated with the suggested text. The application plugin 110 receives the results and interacts with the application 104 to display the results to the user via the UI 106 of the application 104. Details related to the processing performed by the various systems and subsystems in FIG. 1 for predicting text to be suggested are described below with respect to the flowcharts depicted in FIGS. 2A, 2B, 2C and 2D and their accompanying description. In the embodiment depicted in FIG. 1, the text prediction system 102 is shown as a separate system that is communicatively connected to the user device 103 via a communication network (e.g., the Internet). In alternate approaches, the text prediction system 102 may be implemented within the user device 103 to provide text prediction functionality to a user (e.g., 108) of the user device 103.

Figure 2A:
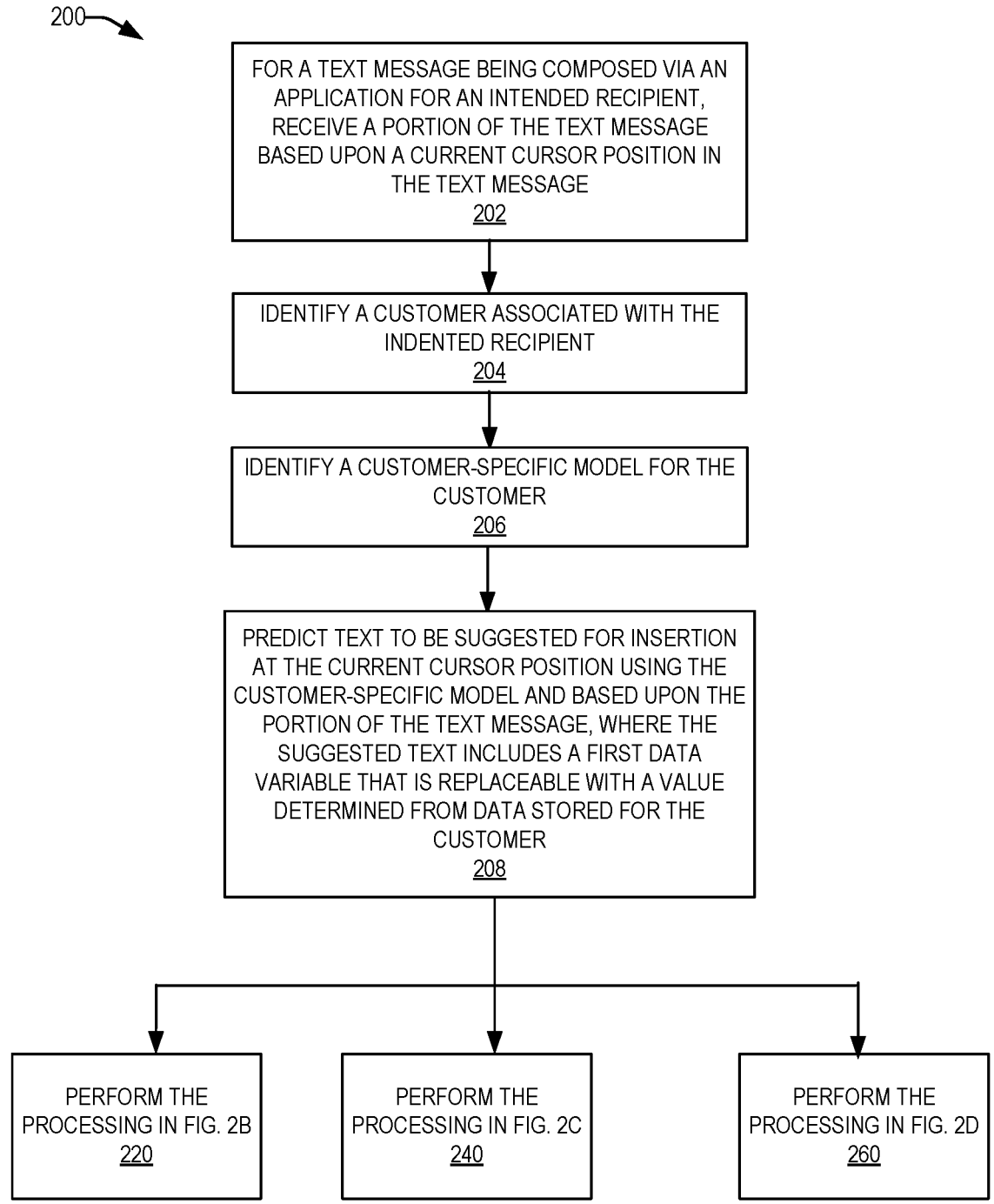
FIG. 2A depicts an example of a process for predicting text to be suggested for insertion at a current cursor position in a text message being composed for an intended recipient, according to certain embodiments.

FIG. 2A depicts an example of a process 200 for predicting text to be suggested for insertion at a current cursor position in a text message being composed for an intended recipient, according to certain embodiments. The processing depicted in FIG. 2 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 200 presented in FIG. 2A and described below is intended to be illustrative and non-limiting. Although FIG. 2A depicts the various processing steps occurring in a particular sequence or order, this is not intended to be limiting. In certain alternative embodiments, the steps may be performed in some different order, or some steps may also be performed in parallel. In certain embodiments, such as in the embodiment depicted in FIG. 1, the processing depicted in FIG. 2A may be performed by the text prediction system. In certain embodiments, within the text prediction system, the processing in 202-208 may be performed by one or more subsystems of the text prediction system.

In the embodiment depicted in FIG. 2A, processing is initiated when, in block 202, for a text message being composed via an application for an intended recipient, the text prediction system 102 receives a portion of a text message 112 based upon a current cursor position in the text message. For instance, as previously noted, the text message may be composed by a user 108 via the UI 106 of the application 104 in the user device 103 and the application plugin 110 may select a portion of the text message based upon the current cursor position in the text message and transmit the portion of the text message 112 to the text predictor 114 in the text prediction system 102 for analysis.

At block 204, the text predictor identifies a customer associated with the intended recipient.

At block 206, the text predictor 114 identifies a customer-specific model for the customer. In a certain implementation, the text predictor 114 may identify (or select) a customer-specific model (e.g., 116) for the customer from a set of models trained or tuned by a training system/tuning system 120. In certain examples, the training system/tuning system 120 may be configured to generate a customer-specific model for a customer using data that is specific to a customer (referred to herein as customer-specific data 123). For example, if the customer is associated with a particular company (e.g., Company A), the text predictor selects (identifies) a customer-specific model in the training system/tuning system 120 that is trained or tuned based upon Company A data, and so the suggestion or prediction provided by that model is specific to Company A and thus more personalized for the recipient associated with the customer. Additional details of the processing performed by the training system/tuning system to generate customer-specific models are described in FIG. 3A, FIG. 3B and FIG. 3C. The training system/tuning system 120 may represent a system within the text prediction system 102 shown in FIG. 1 or may represent a system (or an external service) that is remote from (or external to) the text prediction system 102 and accessible via one or more communication networks, by the subsystems of the text prediction system.

At block 208, the text predictor 114 predicts text to be suggested for insertion at the current cursor position using the customer-specific model identified in block 206 and based upon the portion of the text message. The suggested text may include a set of one or more data variables that are replaceable with values determined from data stored for the customer. In certain examples, the suggested text includes a first data variable, where the first data variable is replaceable with a value determined from data stored for the customer.

For example, the suggested text 118 generated for a customer A using a customer-specific model (e.g., 116) may be "Your order is currently $ShipStatus," where $ShipStatus represents a first data variable in the suggested text that is replaceable with a value determined from data stored for the customer. The text predictor 114 then performs the processing described in FIG. 2A, FIG. 2B or FIG. 2C to provide the suggested text for insertion (e.g., type-ahead insertion) at a current cursor position based upon a portion of a text message composed by a user.

Figure 2B:
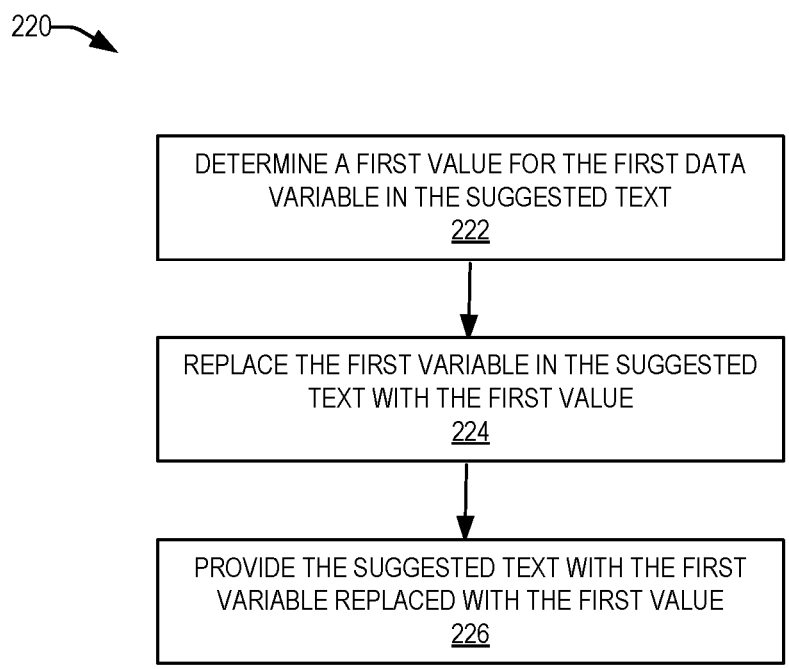
FIG. 2B describes a first embodiment for providing suggested text for insertion at a current cursor position based upon a portion of a text message composed by a user, according to certain embodiments.

FIG. 2B describes a first embodiment for providing suggested text for insertion at a current cursor position based upon a portion of a text message composed by a user, according to certain embodiments. The processing depicted in FIG. 2B may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 220 presented in FIG. 2B and described below is intended to be illustrative and non-limiting. Although FIG. 2B depicts the various processing steps occurring in a particular sequence or order, this is not intended to be limiting. In certain alternative embodiments, the steps may be performed in some different order, or some steps may also be performed in parallel. In certain embodiments, such as in the embodiment depicted in FIG. 1, the processing depicted in FIG. 2B may be performed by the text prediction system. In certain embodiments, within the text prediction system, the processing in 222-226 may be performed by one or more subsystems of the text prediction system.

At block 222, the text predictor 114 determines a value for the first data variable in the suggested text based on one or more information sources storing the data associated with the customer. In certain embodiments, the processing performed by the text predictor 114 at block 222 involves transmitting, by the text predictor 114, the first data variable to the variable replacer 124. The variable replacer 124 receives the first data variable and transmits the first data variable to the data integrator 126 in the text prediction system 102. The data integrator 126 determines a first value for the first variable based upon one or more information sources 128 (e.g., applications, databases and the like) that store data associated with the customer.

As part of the processing performed by the data integrator 126 to determine the first value for the first data variable, the data integrator 126 identifies the specific data sources from the information sources 128 that are associated with the customer identified in block 204 (shown in FIG. 2A). The data integrator 126 then communicates with the identified data sources to obtain the first value for the first data variable. For instance, if the first data variable in the suggested text represents shipping information (e.g., $ShipStatus) associated with the recipient of the customer, the data integrator 126 may communicate with a shipping application associated with the customer to obtain a value for the $ShipStatus data variable. For a data variable that represents salary information (e.g., $SalaryAmount) associated with the recipient of the customer, the data integrator 126 may communicate with a different application or database (e.g., a payroll database) associated with the customer to obtain the value for the $SalaryAmount data variable. The data integrator 126 then returns the first value for the first variable to the variable replacer 124.

At block 224, the variable replacer 124 replaces the first variable in the suggested text with the first value determined in 212 and provides the first value to the text predictor 112. At block 226, the text predictor 112 provides the suggested text with the first variable replaced with the first value to the application plugin 110. The application plugin 110 provides the suggested text and the first value to the application which then displays the result (i.e., the suggested text and the value) via the user interface of the application executing in the user device.

Figure 2C:
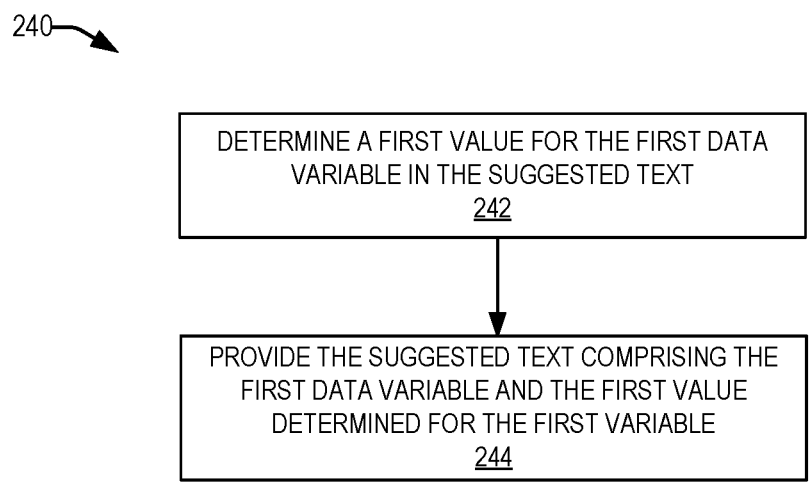
FIG. 2C describes a second embodiment for providing suggested text for insertion at a current cursor position based upon a portion of a text message composed by a user, according to certain embodiments.

FIG. 2C describes a second embodiment for providing suggested text for insertion at a current cursor position based upon a portion of a text message composed by a user, according to certain embodiments. The processing depicted in FIG. 2C may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 240 presented in FIG. 2C and described below is intended to be illustrative and non-limiting. Although FIG. 2C depicts the various processing steps occurring in a particular sequence or order, this is not intended to be limiting. In certain alternative embodiments, the steps may be performed in some different order, or some steps may also be performed in parallel. In certain embodiments, such as in the embodiment depicted in FIG. 1, the processing depicted in FIG. 2C may be performed by the text prediction system. In certain embodiments, within the text prediction system, the processing in 242-244 may be performed by one or more subsystems of the text prediction system.

At block 242, the text predictor 114 determines a first value for the first data variable in the suggested text based on one or more information sources associated with the customer. The processing performed by the text predictor 114 to determine a first value for the first data variable is similar to the processing described in block 222 of FIG. 2B.

At block 244, the text predictor 114 provides the suggested text comprising the first data variable and the first value to the application. Thus, in the embodiment described in FIG. 2C, the text predictor 114 does not provide suggested text comprising a data variable that is replaced with its corresponding value to the application (as described in the embodiment described in FIG. 2B), but, instead, provides the suggested text comprising a data variable (e.g., the first data variable) and the first value to the application.

The application then displays the suggested text comprising the first data variable via the UI. For instance, the application may display the suggested text responsive to receiving an indication (e.g., from the user) indicating selection of the suggested text for insertion at the current cursor position. The application may then display the first value associated with the first variable via the UI. The application may receive a selection of the first value from the user and responsive to the selected first value, replace the first variable with the first value.

Figure 5:
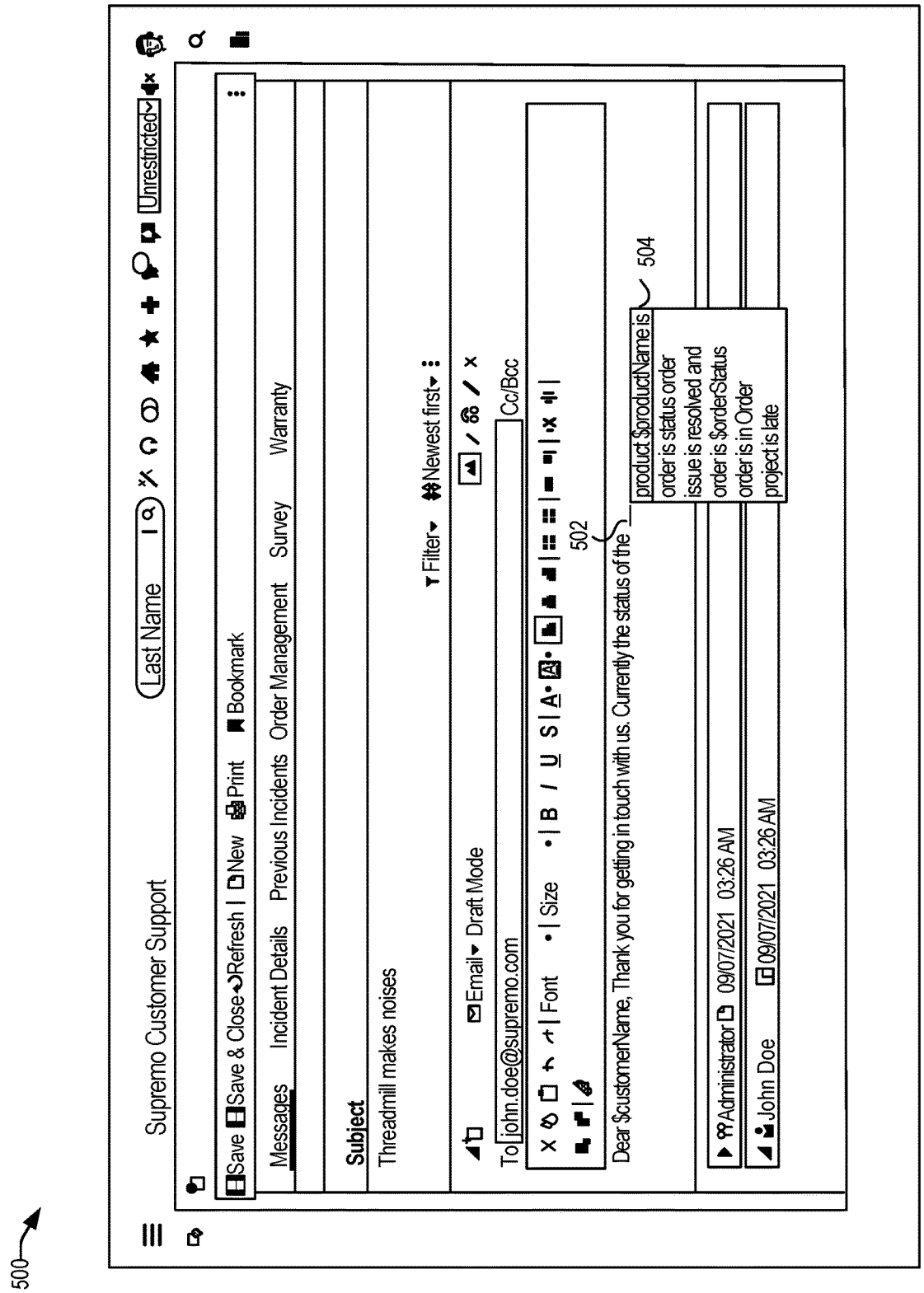
FIG. 5 is an example of a user interface (UI) of an application displaying suggested text for insertion at a current cursor position in a text message being composed by a user via an application, according to certain embodiments.

In certain examples, the application receives the suggested text comprising one or more data variables from the text prediction system (e.g., as a result of executing block 208 in FIG. 2A). Upon selection of the suggested text by the user, the application inserts the suggested text with the data variables at the current cursor position. For example, the data variables in suggested text that have been accepted by the user for insertion in the text message may be displayed with a "$" symbol (e.g., $shipstatus). In certain examples, the text prediction system may provide the application with multiple suggested texts for selection by the user. An example of multiple suggested texts that may be displayed via the UI of the application is illustrated in FIG. 5.

After selecting a particular suggested text comprising one or more data variables, the user can continue to type the text message and choose to replace the data variable(s) in the suggested text that have been accepted by the user with their corresponding values at a later point in time. As the user continues to type the text message, based on a new current position of the cursor, the application may determine a different (e.g., a second portion) of the message to be selected for determining suggested text and transmit the selected second portion of the text message to the text prediction system for analysis. The application receives suggested text with one or more data variables from the text prediction system that pertains to the second portion of the text message and provides it via the UI. If the user selects the suggested text for insertion, then the application inserts the suggested text with the data variables at the new current cursor position.

Figure 6:
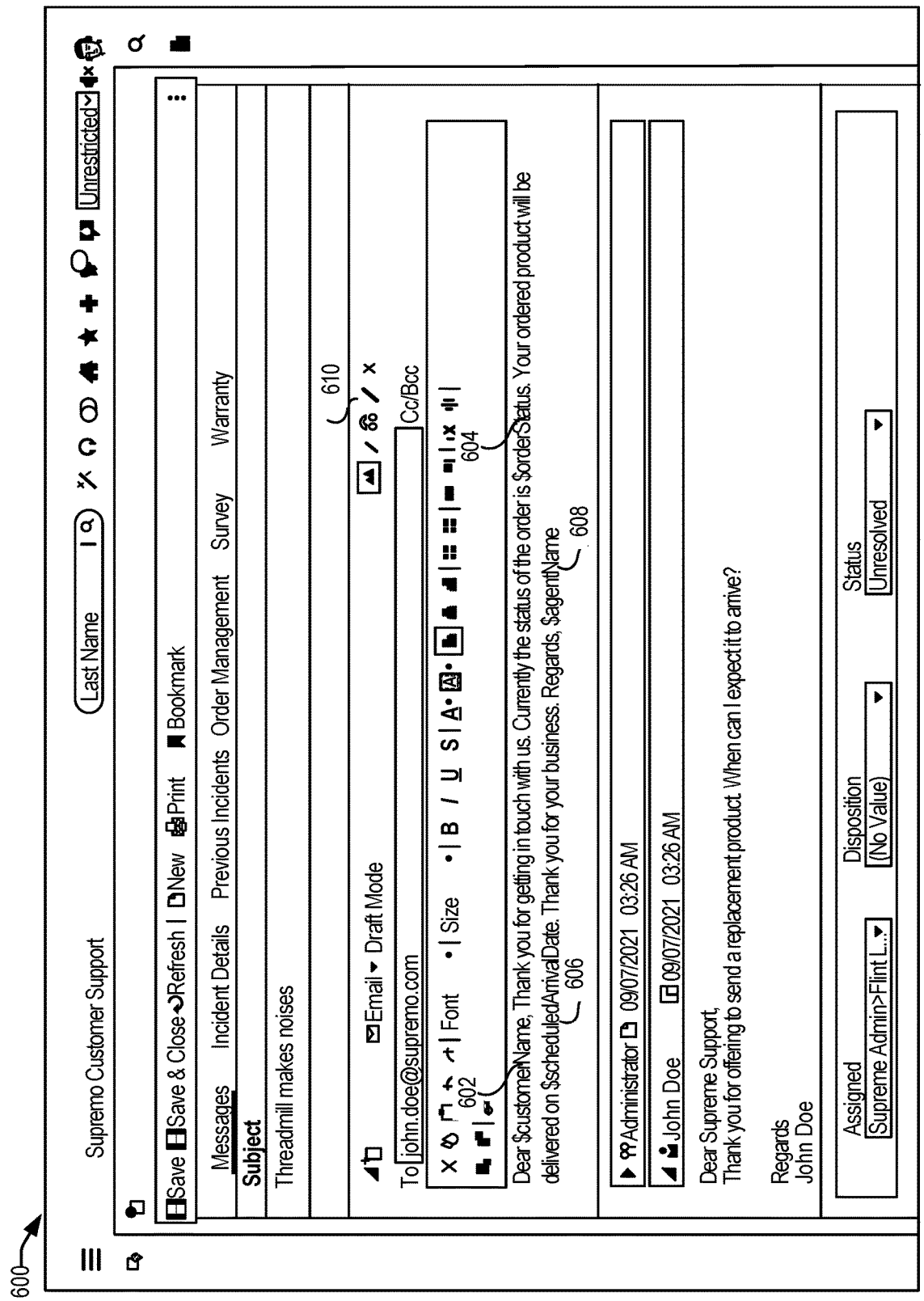
FIG. 6 is an example of a user interface (UI) of an application displaying different suggested texts that have been inserted into a text message composed by the user via an application, according to certain embodiments.
Figure 7:
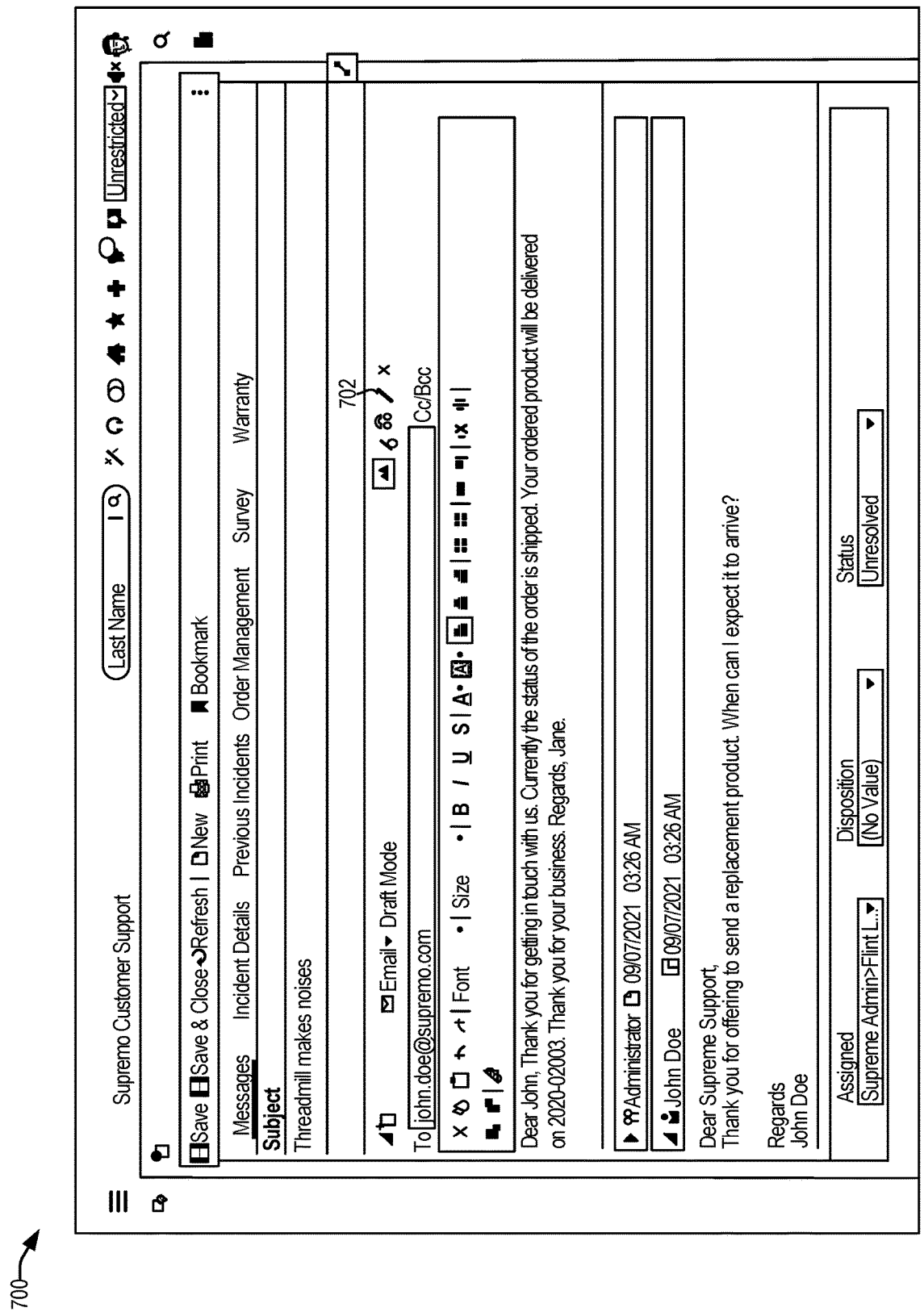
FIG. 7 is an example of a user interface (UI) of an application displaying suggested text and values associated with the suggested text in a text message composed by a user, according to certain embodiments.

In this manner, the text prediction system includes capabilities to predict text to be suggested for insertion (i.e., type-ahead insertion) at a current cursor position in the text message being composed. For each cursor position of a text message being composed, the text prediction system may be configured to provide different suggested texts comprising different data variables as shown in the UI of FIG. 6. After the user has typed a certain number (one or more) of sentences, the user may choose to replace one or all the data variables in the suggested texts presented to the user. For instance, the user may choose to replace one or all the data variables by selecting a UI element displayed via the UI of the application as shown in FIG. 7. Upon receiving an indication from the user to replace one or all data variables in different suggested texts determined by the text prediction system, the application then communicates with the text prediction system to obtain values for the data variables. The operations performed by the application and the text prediction system to replace the data variables in the text message are additionally described in FIG. 2D and FIG. 2E below.

Figure 2D:
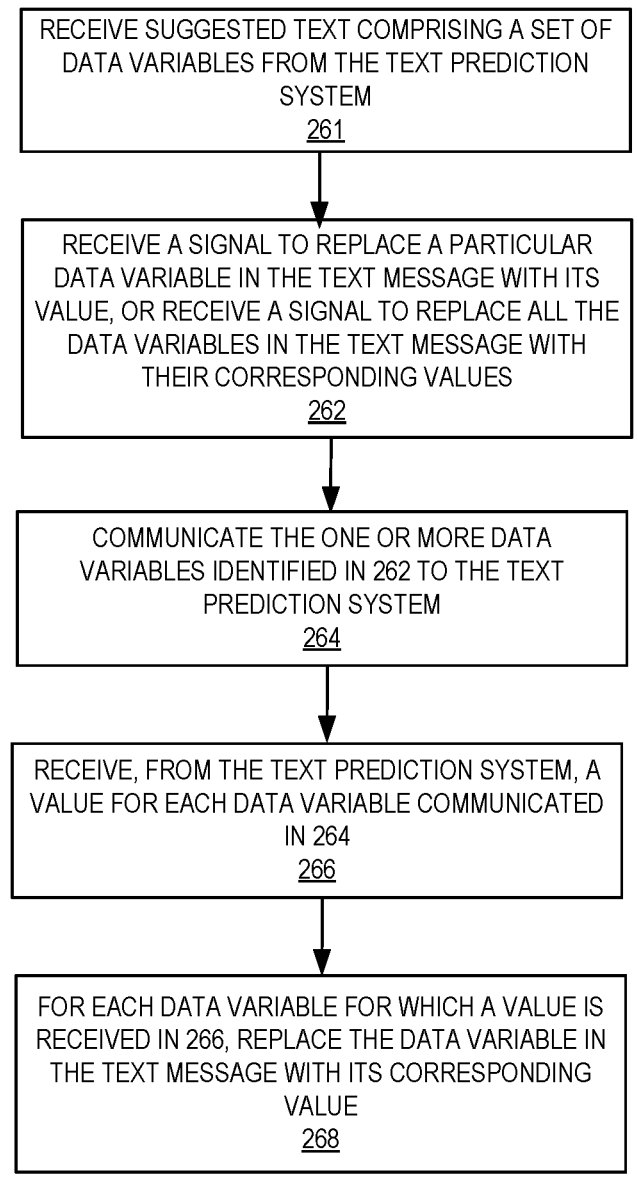
FIG. 2D describes a third embodiment for providing suggested text for insertion at a current cursor position based upon a portion of a text message composed by a user, according to certain embodiments.

FIG. 2D describes a third embodiment for providing suggested text for insertion at a current cursor position based upon a portion of a text message composed by a user, according to certain embodiments. The processing depicted in FIG. 2D may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 260 presented in FIG. 2D and described below is intended to be illustrative and non-limiting. Although FIG. 2D depicts the various processing steps occurring in a particular sequence or order, this is not intended to be limiting. In certain alternative embodiments, the steps may be performed in some different order, or some steps may also be performed in parallel. In certain embodiments, such as in the embodiment depicted in FIG. 1, the processing depicted in FIG. 2D may be performed by the application 104 in the user device.

At block 261, the application receives suggested text comprising a set of data variables from the text prediction system.

At block 262, the application receives a signal to replace a particular data variable in the text message with its value. In certain examples, at block 262, the application may receive a signal to replace all the data variables in the text message with their corresponding values. In certain examples, the application receives a signal from the user when the user selects a user interface element in the UI of the application as shown in FIG. 7.

At block 264, the application communicates the one or more data variables to the text prediction system. At block 266, the application receives a value for each data variable from the text prediction system. At block 268, the application replaces each data variable in the text message with its corresponding value.

Figure 2E:
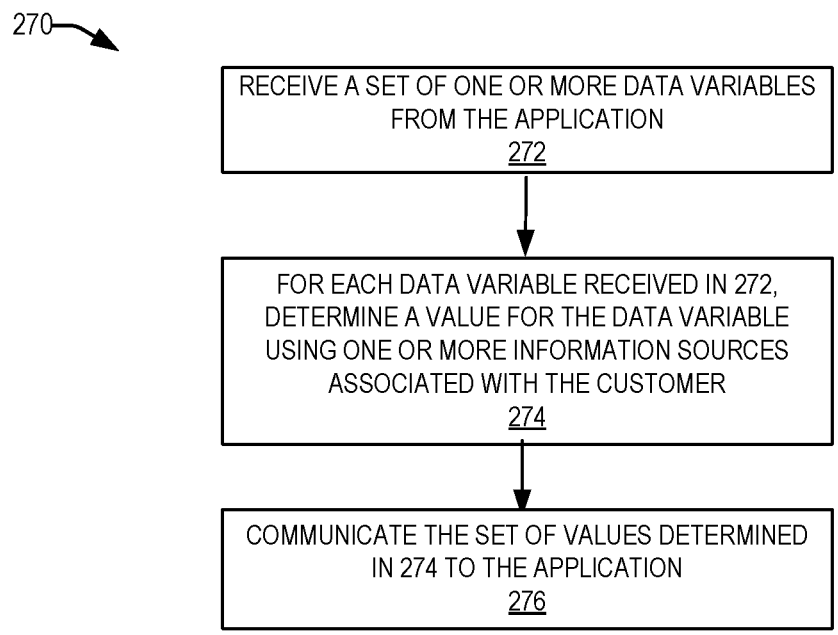
FIG. 2E describes operations performed by the text prediction system responsive to receiving one or more data variables from the application, according to certain embodiments.

FIG. 2E describes operations performed by the text prediction system responsive to receiving one or more data variables from the application, according to certain embodiments. The processing depicted in FIG. 2E may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 270 presented in FIG. 2E and described below is intended to be illustrative and non-limiting. Although FIG. 2E depicts the various processing steps occurring in a particular sequence or order, this is not intended to be limiting. In certain alternative embodiments, the steps may be performed in some different order, or some steps may also be performed in parallel. In certain embodiments, such as in the embodiment depicted in FIG. 1, the processing depicted in FIG. 2E may be performed by the text prediction system. In certain embodiments, within the text prediction system, the processing in 272-276 may be performed by one or more subsystems of the text prediction system.

In certain examples, as a result of executing block 264 by the application in FIG. 2D, at block 272, the text prediction system receives a set of one or more data variables from the application.

At block 274, the text prediction system determines a value for each data variable received using one or more information sources associated with the customer. In certain instances, the data integrator 126 may communicate with various different information sources identified for the customer to obtain values for the different data variables. For instance, if the predicted text associated with a customer includes sales information (i.e., a sales variable) as well as information regarding a current order placed for an item by the recipient (i.e., an item variable), the data integrator may communicate with a first data source (e.g., a sales database) associated with the customer to obtain a value for the sales variable and a different data source (e.g., a product database) associated with the customer to obtain value for the item variable.

In certain instances, the data integrator 126 may utilize various data acquisition techniques to obtain the information from the information sources 128. For instance, for a data source that is an SQL database, the data integrator may identify a first data acquisition technique (for e.g., submit an SQL query to the SQL database) to be used to obtain a value for a data variable, whereas for data source that is an object oriented database, the data integrator may identify a different data acquisition technique (e.g., REST APIs calls, Graph QL calls and the like) to be used obtain a value for the variable. Additionally, in certain embodiments, for predicted text that contains more than one data variable, the data integrator may identify a first data acquisition technique to obtain a value for a first data variable from a first data source identified for the recipient and identify a second data acquisition technique to obtain a value for a second data variable from a second data source identified for the recipient. In certain examples, the data integrator may utilize a set of mapping rules stored by the text prediction system to determine the particular data acquisition technique to be used for obtaining a value for a variable For instance, a first mapping rule may map the first data variable to a first data acquisition technique for obtaining a value for the first data variable whereas a second mapping rule may map the second data variable to a second data acquisition technique for obtaining a value for the second data variable.

At block 276, the text prediction system communicates the set of values to the application.

Figure 3A:
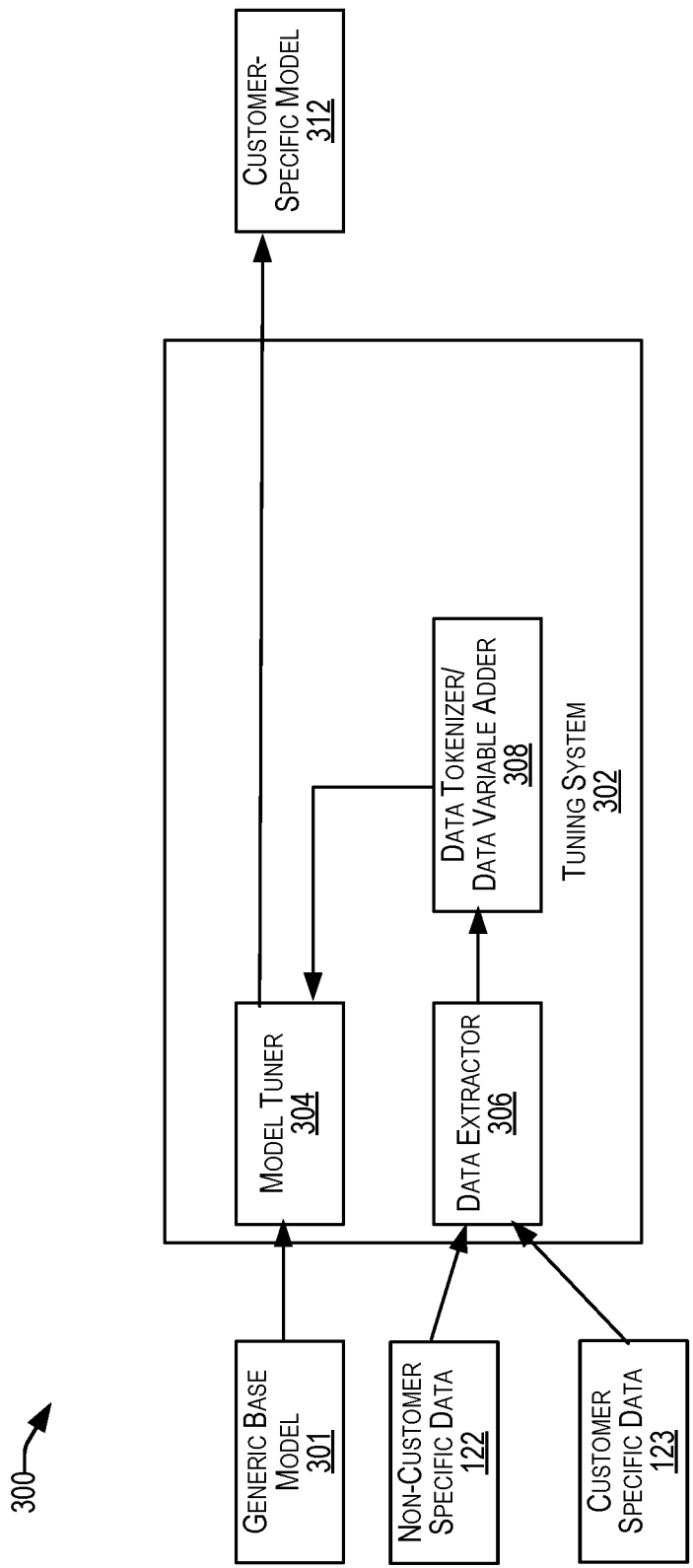
FIG. 3A depicts a tuning system used by the text prediction system for generating a customer-specific model for predicting text to be suggested for insertion at a current cursor position in a text message, in accordance with certain embodiments.

FIG. 3A depicts a tuning system used by the text prediction system for generating a customer-specific model for predicting text to be suggested for insertion at a current cursor position in a text message, in accordance with certain embodiments. In the embodiment depicted in FIG. 3A, the tuning system 302 includes various subsystems such as a model tuner 304, a data extractor 306 and a data tokenizer/data variable adder 308. The subsystems depicted in FIG. 3A may be implemented using software (e.g., code, instructions, program) executed by one or more processing units (e.g., processors, cores) of a computing system, hardware, or combinations thereof. The software may be stored on a non-transitory storage medium (e.g., on a memory device).

In the embodiment depicted in FIG. 3A, the model tuner 304 generates and tunes a customer-specific model 312 using a generic base model 301. In a certain implementation, the generic base model 301 used by the model tuner 304 is a Natural Language Generation (NLG) Model that is pre-trained (using publicly available data) to generate text predictions. The NLG model may represent a machine learning model, such as, a supervised learning model, a support-vector machine (SVM) model, an unsupervised learning model, a one class SVM classifier and so on that can perform both supervised and unsupervised learning respectively. The generic base model 301 is then tuned by the model tuner 304 using non-customer specific data 122 and customer specific data 123 to generate a customer-specific model (e.g., 312) for a customer. Customer specific data 123 may include information such as company specific terminology and information, such as, product manuals or company specific FAQs associated with a specific customer. Customer specific data 123 may additionally include past queries received from the customer, past text messages composed by the user for the customer and so on. Non-customer specific data 122 may include generic information that is not specific to any customer such as, for instance, a greeting to be inserted into a text message being composed for an intended recipient. For instance, the predicted text to be suggested for a portion of the text message may include a generic greeting (e.g., Hello) that is inserted into the text message.

In certain embodiments, the data extractor 306 and the data tokenizer/data variable adder 308 in the tuning system 302 may be configured to process the non-customer-specific data 122 and the customer-specific data 123 prior to providing it to the model tuner 304. For instance, the data extractor 306 may process the non-customer specific data 122 and the customer specific data 123 using a variety of data processing techniques such as by performing stemming and lemmatization techniques on the data, expanding contractions in the data for better analysis, removing stop words, rephrasing text in the data and so on. In certain approaches, the processing may be performed automatically by the data extractor 132. In alternate approaches, an administrator 138 of the text prediction system may manually process the data 122 and 123 and provide the processed data to the data extractor 306. The processed data is then provided to the data tokenizer/data variable adder 308 which, in turn, identifies certain data elements (e.g., words) in the data (e.g., a text message) that can be tokenized. The data tokenizer/data variable adder then tokenizes (i.e., substitutes or replaces) the data elements in the data with data variables. Examples of data variables may include, for instance, $person/$name, $email, $phone_number, $location, $organization, $product, $url, $quantity/$number, $date & $time, $currency, $percentage or $enum-value and the like. In certain approaches, the tokenization of data may be automatically performed by the data tokenizer/data variable adder 134. In other approaches, an administrator of the tuning system 302 may manually annotate the non-customer specific data 122 and the customer-specific data 123 to replace certain data elements in the data with data variables and provide the data variables to the data tokenizer/data variable adder 308. The data variables specific to one customer may be different from the data variables specific to a different customer. For example, the data variables specific to a first customer (e.g., a customer A) may include the Customer Address, Ship Date or Ship Status whereas the data variables specific to a different customer (e.g., Customer B) may include a different set of data variables such as the Customer Name, Sell Date, Inventory Status, and so on.

The data tokenizer/data variable adder 308 then transmits the data variables specific to a particular customer to the model tuner 304. The model tuner 304 uses the data variables specific to a customer for tuning the generic base model 301 to generate a customer-specific model 312 for the customer.

The tuning system 302 may be configured to generate different customer-specific models for different customers. Each customer-specific model is generated by the model tuner 304 using data that is specific to the customer as well as non-customer specific data as described above, and each customer-specific model is used to predict text that is personalized to that customer. For example, a customer-specific model A that is tuned by the model tuner 304 using customer A data provides text predictions that are specific and more personalized to customer A. Similarly, a customer-specific model B that is tuned using customer B data provides text predictions that are specific and personalized to recipient B and a recipient-specific model C that is tuned using recipient C data 318 provides text predictions that are specific and personalized to customer C.

Figure 3B:
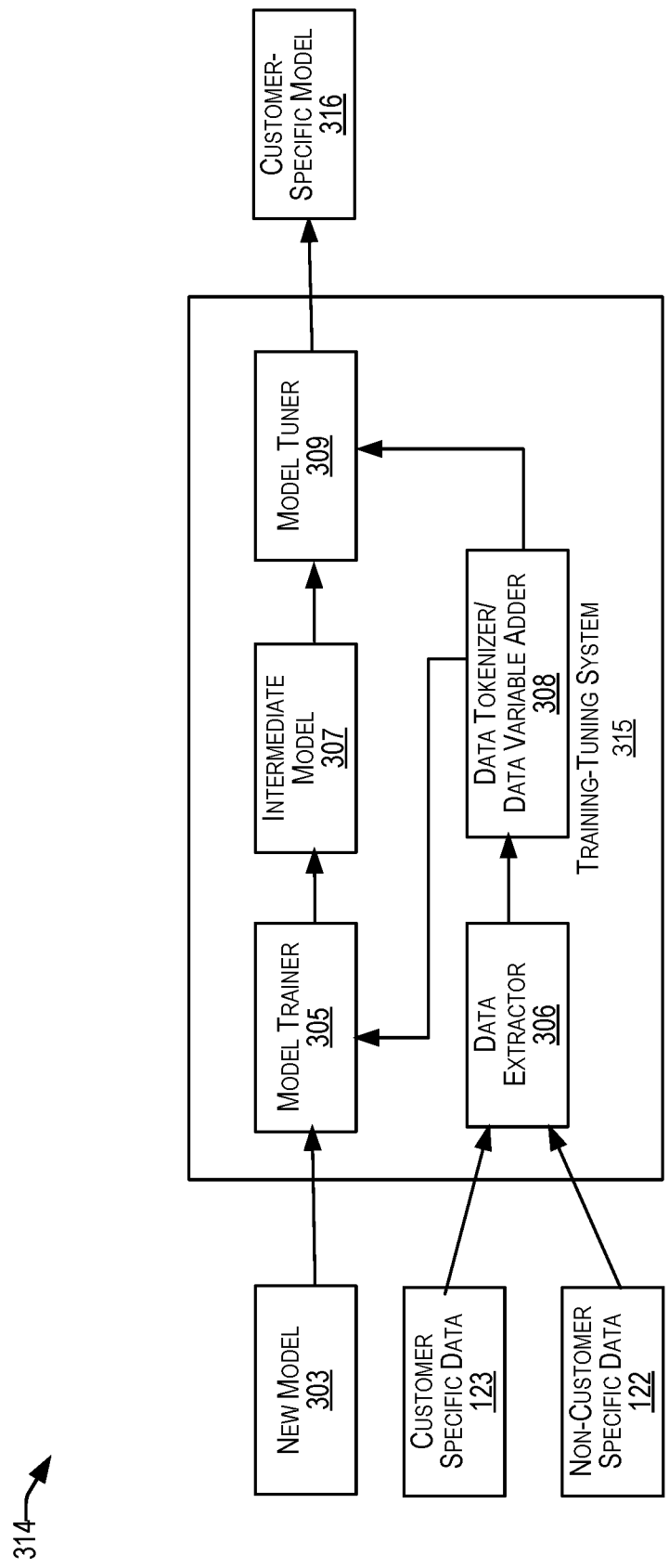
FIG. 3B depicts a training-tuning system used by the text prediction system for generating a customer-specific model for predicting text to be suggested for insertion in a portion of a text message, in accordance with certain embodiments.

FIG. 3B depicts a training-tuning system used by the text prediction system for generating a customer-specific model for predicting text to be suggested for insertion in a portion of a text message, in accordance with certain embodiments. The training-tuning system 315 includes various subsystems such as a model trainer 305, a data extractor 306, a data tokenizer/data variable adder 308 and a model tuner 309. The subsystems depicted in FIG. 3B may be implemented using software (e.g., code, instructions, program) executed by one or more processing units (e.g., processors, cores) of a computing system, hardware, or combinations thereof. The software may be stored on a non-transitory storage medium (e.g., on a memory device).

In the embodiment depicted in FIG. 3B, the model trainer 305 uses a new model 303 to generate and train an intermediate model 307. The new model 303 may represent a machine learning model, such as, a supervised learning model, a support-vector machine (SVM) model, an unsupervised learning model, a one class SVM classifier and so on that can perform both supervised and unsupervised learning respectively. In certain approaches, the model trainer 305 may utilize non-customer-specific data 122 to generate the intermediate model 307. The non-customer-specific data 122 may be processed by the data extractor 306 and tokenized by the data tokenizer/data variable adder 308 as described above and provided to the model trainer 305. The intermediate model 307 may then be tuned by a model tuner 309 using the customer-specific data 123 (that has been processed by the data extractor and tokenized by the data tokenizer/data variable adder 308 to generate data variables specific to a customer) to generate a customer-specific model 316 for the customer. In other approaches, the model trainer 305 may utilize both customer specific data 123 in as well as non-customer specific data 122 to generate the intermediate model 307. The intermediate model 307 may then be further fine-tuned by the model tuner 309 using the customer-specific data 123 to generate the customer-specific model 316 for the customer.

Figure 3C:
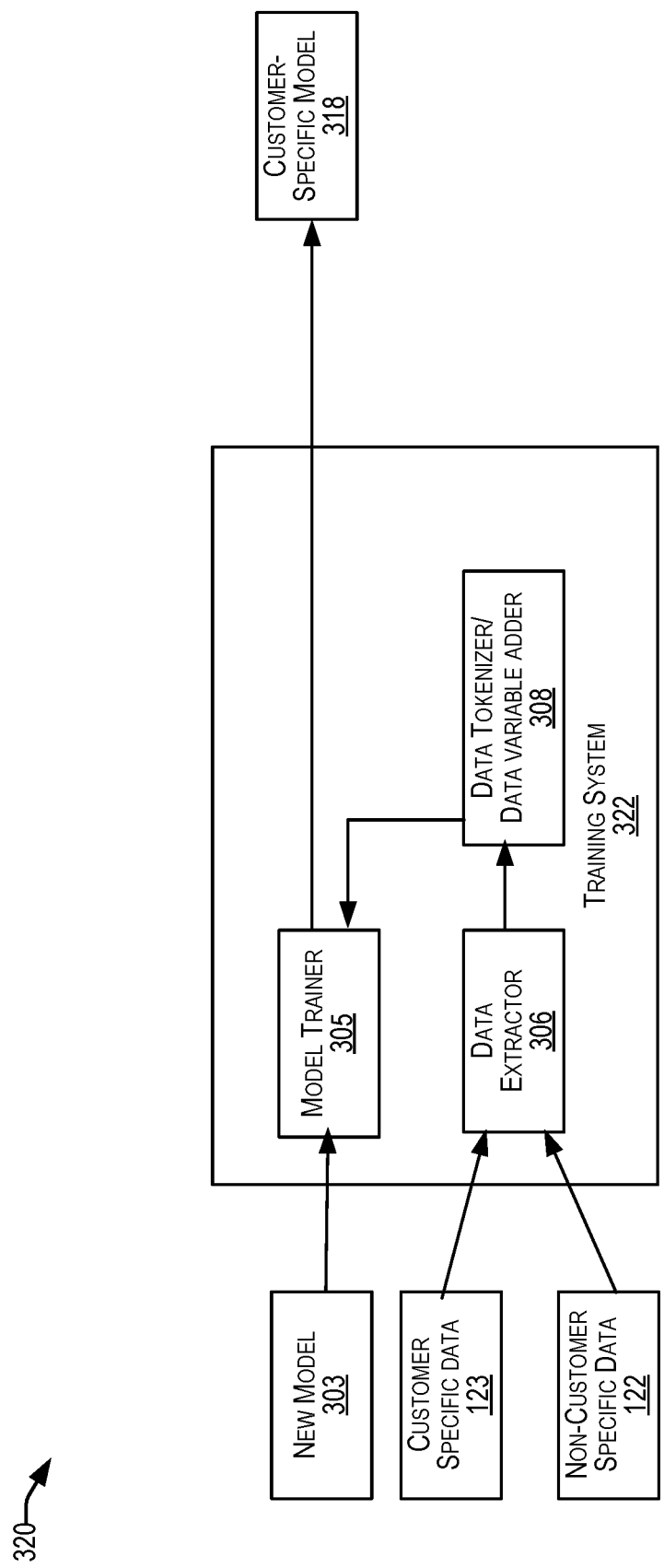
FIG. 3C depicts a training system used by the text prediction system for generating a customer-specific model for predicting text to be suggested for insertion in a portion of a text message, in accordance with certain embodiments.

FIG. 3C depicts a training system used by the text prediction system for generating a customer-specific model for predicting text to be suggested for insertion in a portion of a text message, in accordance with certain embodiments. The training system 322 includes various subsystems such as a model trainer 305, a data extractor 306 and a data tokenizer/data variable adder 308. The subsystems depicted in FIG. 3B may be implemented using software (e.g., code, instructions, program) executed by one or more processing units (e.g., processors, cores) of a computing system, hardware, or combinations thereof. The software may be stored on a non-transitory storage medium (e.g., on a memory device).

In the embodiment depicted in FIG. 3C, the model trainer 305 uses a new model 303 to train and generate a customer-specific model 318. As previously described, the new model 303 may represent a machine learning model, such as, a supervised learning model, a support-vector machine (SVM) model, an unsupervised learning model, a one class SVM classifier and so on that can perform both supervised and unsupervised learning respectively. The model trainer 305 trains the new model using non-customer-specific data 122 and customer-specific data 123. The data 122 and 123 may be processed by the data extractor 306 and tokenized by the data tokenizer/data variable adder 308 as described above to generate data variables specific to a customer. The data tokenizer/data variable adder 308 then transmits the data variables specific to a particular customer to the model trainer 305. The model trainer 305 uses the data variables to train and generate a customer-specific model 318 for the customer.

Figure 4:
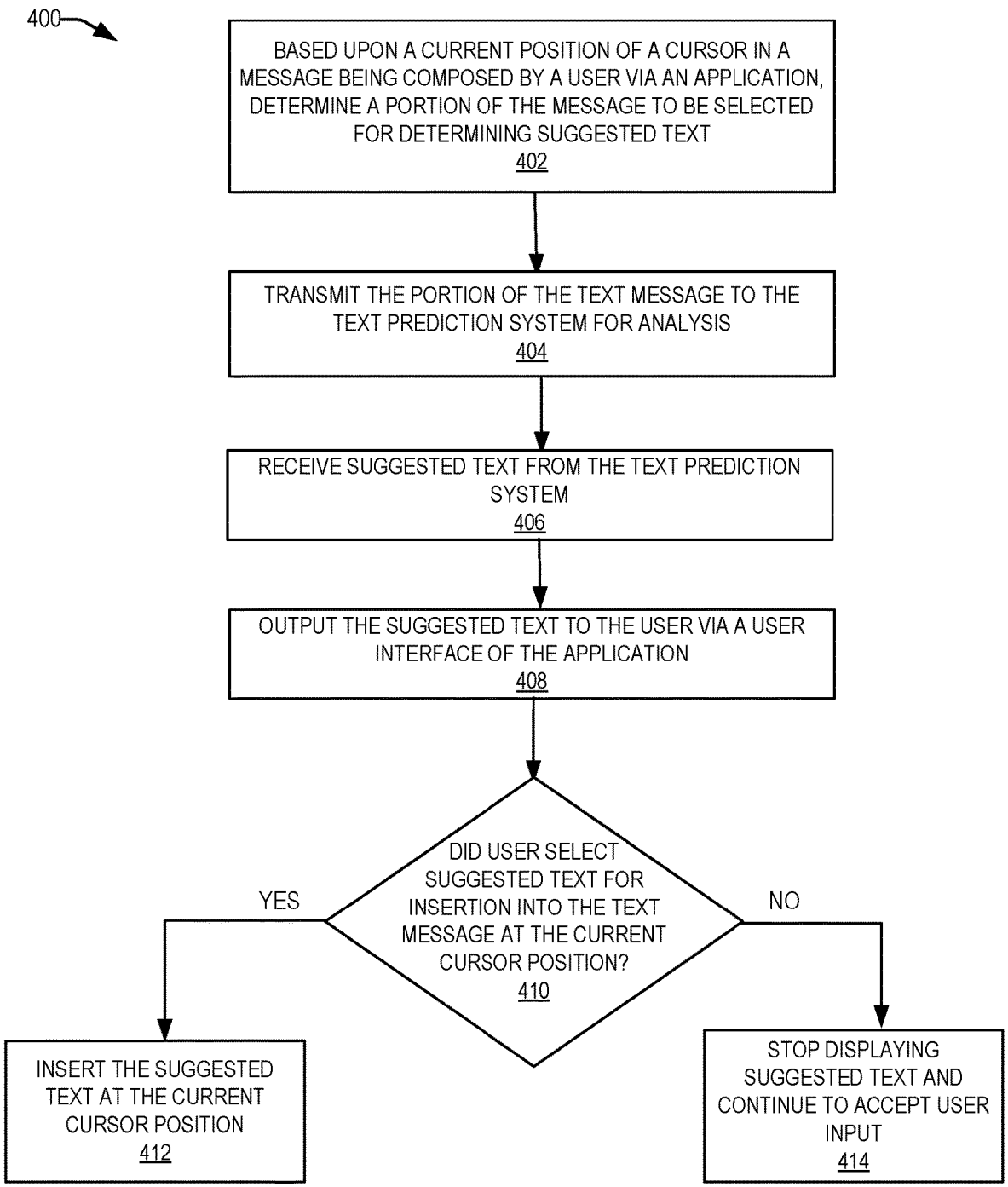
FIG. 4 depicts an example of a process that describes the interaction of the application plugin in the user device shown in FIG. 1 with the text prediction system, according to certain embodiments.

FIG. 4 depicts an example of a process 400 that describes the interaction of the application plugin in the user device shown in FIG. 1 with the text prediction system, according to certain embodiments. The processing depicted in FIG. 4 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 400 presented in FIG. 4 and described below is intended to be illustrative and non-limiting. Although FIG. 4 depicts the various processing steps occurring in a particular sequence or order, this is not intended to be limiting. In certain alternative embodiments, the steps may be performed in some different order, or some steps may also be performed in parallel.

In the embodiment depicted in FIG. 4, processing is initiated when, in block 402, the application plugin 110 determines a portion of a message to be selected for determining suggested text based upon a current position of a cursor in a text message being composed by a user 108 via an application 104 in the user device 103. As previously described, the portion of the text message that is selected by the application plugin may include the previous 'n' words (where 'n' is a user-configurable value) from the current cursor position. At block 404, the application plugin 110 transmits the portion of the text message to the text prediction system for analysis. At block 406, the application plugin 110 receives suggested text from the text prediction system 102. For example, the text prediction system 102 may perform the analysis described in FIG. 2A to predict text to be suggested for insertion (i.e., type-ahead insertion) at a current cursor position in the text message being composed. At block 408, the application plugin 110 provides (outputs) the suggested text to the user via the user interface of the application. In certain examples, and as described above, the suggested text may include data variables and data variable values that are replaceable with values determined from data stored for the customer. At block 410, the application plugin 110 determines if the user selected the suggested text for insertion into the text message at the current cursor position. If the user selected (accepted) the suggested text, then at block 412, the application plugin inserts the suggested text at the current cursor position. If the user did not select the suggested text, at block 414, the application plugin stops displaying the suggested text and continues to accept user input as the user continues to type the text message.

FIG. 5 is an example of a user interface (UI) of an application displaying suggested text for insertion at a current cursor position in a text message being composed by a user via an application, according to certain embodiments. In certain examples, the text prediction system may determine multiple suggested texts for insertion at the current cursor position and provide the multiple suggested texts to the application. The application may display the multiple suggested texts via the UI 500 as shown in FIG. 5. For instance, the UI 500 displays multiple suggested texts 504 for insertion at a current cursor position 502 in a text message being composed by the user. In the depicted embodiment, the multiple suggested texts may be displayed as a dropdown list and the user may select a suggested text from this list. In alternate embodiments, the multiple suggested texts may be displayed using other types of selection controls such as checkboxes, toggle switches, radio buttons and so on.

FIG. 6 is an example of a user interface (UI) of an application displaying different suggested texts that have been inserted into a text message composed by the user via an application, according to certain embodiments. In certain embodiments, as described above, the text prediction system may include capabilities to provide a type-ahead functionality by providing continuous type-ahead suggestions (i.e., suggested texts) for selection as the user composes a text message. For instance, for each cursor position in the text message being composed, the text prediction system may be configured to provide different suggested texts comprising different data variables as shown in the UI of FIG. 6. The depicted UI 600 displays various selected suggested texts comprising different data variables that have been selected by a user at various cursor positions in a text message composed by the user. For instance, in the example shown in FIG. 6, "Dear $customerName" 602 represents a first selected suggested text comprising a first data variable, "Currently the status of the order is $orderStatus" 604 represents a second selected suggested text comprising a second data variable, "Your ordered product will be delivered on $scheduledArrivalDate," 606 represents a third selected suggested text comprising a third data variable, and "Regards, $agentName," 608 represents a fourth selected suggested text comprising a fourth data variable and so on. The suggested texts shown in the UI 600 are illustrative examples only. In other examples, more or fewer suggested texts with more or fewer data variables may be provided to the user via the UI. After the user has typed a certain number of sentences, the user may choose to replace one or all the data variables in the suggested texts presented to the user. For instance, the user may choose to replace one or all the data variables by selecting a UI element 610 displayed via the UI of the application.

FIG. 7 is an example of a user interface (UI) of an application displaying suggested text and values associated with the suggested text in a text message composed by a user, according to certain embodiments. For instance, upon selection of a user-selectable option (e.g., the wand button 702 in the UI), the values along with the suggested text(s) selected by the user may be displayed via the UI. For example, for the above example shown in FIG. 7, where a suggested text generated for a customer A is "Currently the status of the order is $orderStatus," where $orderStatus represents the data variable that is inserted into the suggested text, the fetched value may be "shipped" and so the final predicted text may be "Currently, the status of the order is shipped."

The disclosed text prediction system described above includes capabilities for providing improved and higher levels of personalization of text messages directed to different customers. The system predicts text to be suggested for insertion at a current cursor position in a text message being composed via an application based upon a portion of the text message that is composed and based upon a customer-specific model identified for an intended recipient of the text message. In certain examples, and as described above, the suggested text additionally includes data variables and data variable values that are replaceable with values determined from data stored for the customer. The disclosed text prediction system additionally includes capabilities to predict text to be suggested for type-ahead insertion at a current cursor position in a text message being composed. For instance, for each cursor position of a text message being composed, the text prediction system may be configured to provide a different suggested text comprising different data variables. These suggestions are made seamlessly as the text message is being typed. In certain examples, the text prediction system may present multiple suggestions, and the user who is composing the text message can select a particular text suggestion to insert into the text message.

Example Implementation

Figure 8:
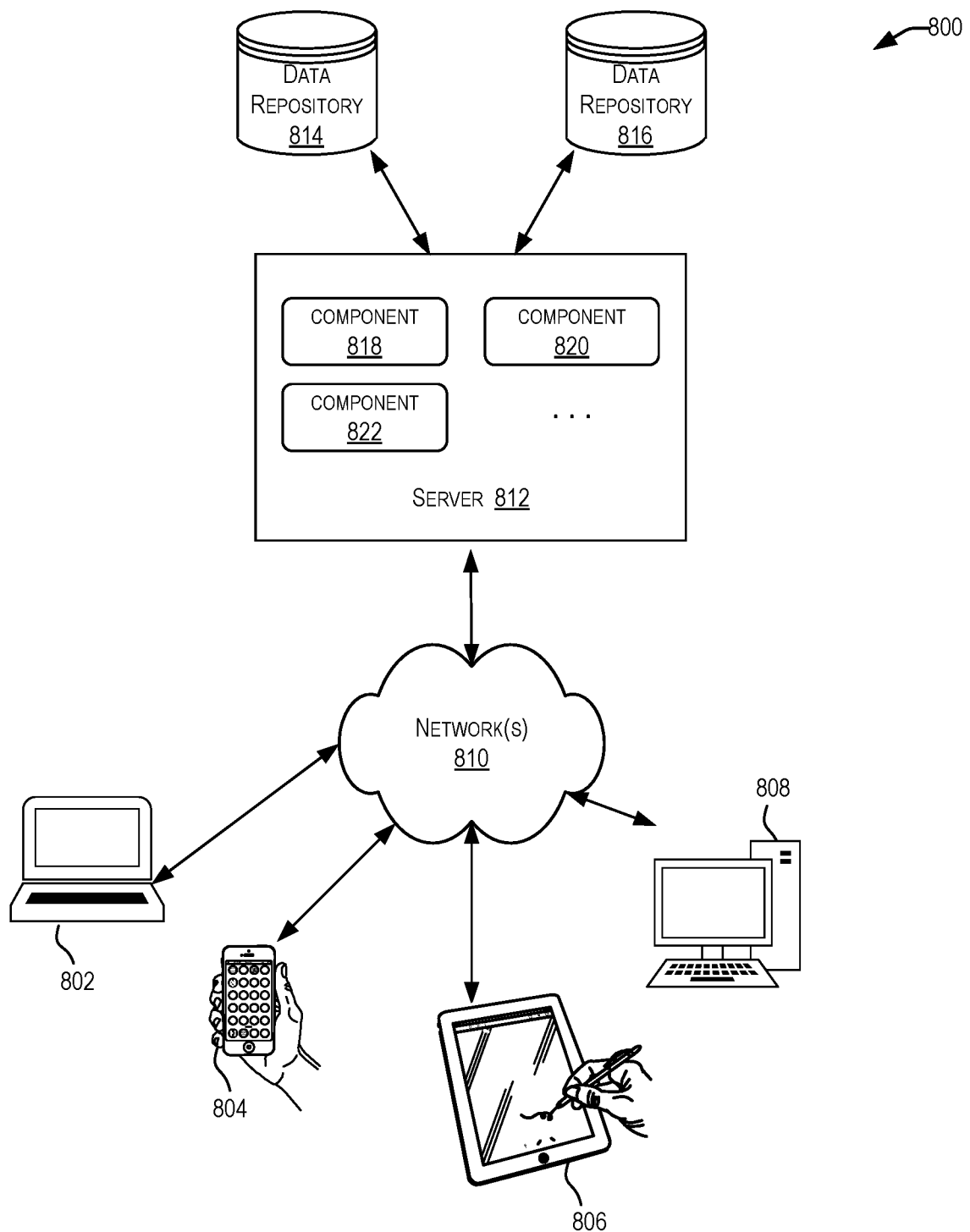
FIG. 8 depicts a simplified diagram of a distributed system for implementing an embodiment.

FIG. 8 depicts a simplified diagram of a distributed system 800 for implementing an embodiment. In the illustrated embodiment, distributed system 800 includes one or more client computing devices 802, 804, 806, and 808, coupled to a server 812 via one or more communication networks 810. Clients computing devices 802, 804, 806, and 808 may be configured to execute one or more applications.

In various embodiments, server 812 may be adapted to run one or more services or software applications that enable the processing described in this disclosure.

In certain embodiments, server 812 may also provide other services or software applications that can include non-virtual and virtual environments. In some embodiments, these services may be offered as web-based or cloud services, such as under a Software as a Service (SaaS) model to the users of client computing devices 802, 804, 806, and/or 808. Users operating client computing devices 802, 804, 806, and/or 808 may in turn utilize one or more client applications to interact with server 812 to utilize the services provided by these components.

In the configuration depicted in FIG. 8, server 812 may include one or more components 818, 820 and 822 that implement the functions performed by server 812. These components may include software components that may be executed by one or more processors, hardware components, or combinations thereof. It should be appreciated that various different system configurations are possible, which may be different from distributed system 800. The embodiment shown in FIG. 8 is thus one example of a distributed system for implementing an embodiment system and is not intended to be limiting.

Users may use client computing devices 802, 804, 806, and/or 808 to interact with server 812 in accordance with the teachings of this disclosure. A client device may provide an interface that enables a user of the client device to interact with the client device. The client device may also output information to the user via this interface. Although FIG. 8 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 810 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 810 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 812 can include one or more virtual machines running virtual operating systems, or other computing architectures involving virtualization such as one or more flexible pools of logical storage devices that can be virtualized to maintain virtual storage devices for the server. In various embodiments, server 812 may be adapted to run one or more services or software applications that provide the functionality described in the foregoing disclosure.

The computing systems in server 812 may run one or more operating systems including any of those discussed above, as well as any commercially available server operating system. Server 812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 812 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 812 may also include one or more applications to display the data feeds and/or real-time events via one or more display devices of client computing devices 802, 804, 806, and 808.

Distributed system 800 may also include one or more data repositories 814, 816. These data repositories may be used to store data and other information in certain embodiments. For example, one or more of the data repositories 814, 816 may be used to store data or information generated by the processing described herein and/or data or information used for the processing described herein. Data repositories 814, 816 may reside in a variety of locations. For example, a data repository used by server 812 may be local to server 812 or may be remote from server 812 and in communication with server 812 via a network-based or dedicated connection. Data repositories 814, 816 may be of different types. In certain embodiments, a data repository used by server 812 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 814, 816 may also be used by applications to store application data. The data repositories used by applications may be of different types such as, for example, a key-value store repository, an object store repository, or a general storage repository supported by a file system.

In certain embodiments, the text prediction services described in this disclosure may be offered as services via a cloud environment. For instance, the text prediction system 102 may be implemented on one or more servers of a cloud provider network and its text prediction services may be provided to subscribers of cloud services on a subscription basis. The functionality to provide text predictions, as described in this disclosure, may be offered as part of the service. A customer can subscribe to the service to generate customized text predictions for its users. The service will generate the customized predictions and send them to the requesting subscriber. As part of generating the prediction, the service may also display the predicted text that is suggested to a user for insertion at a current cursor position in the text message being composed by the user via a UI of a computing device of the requesting subscriber as described in this disclosure.

Figure 9:
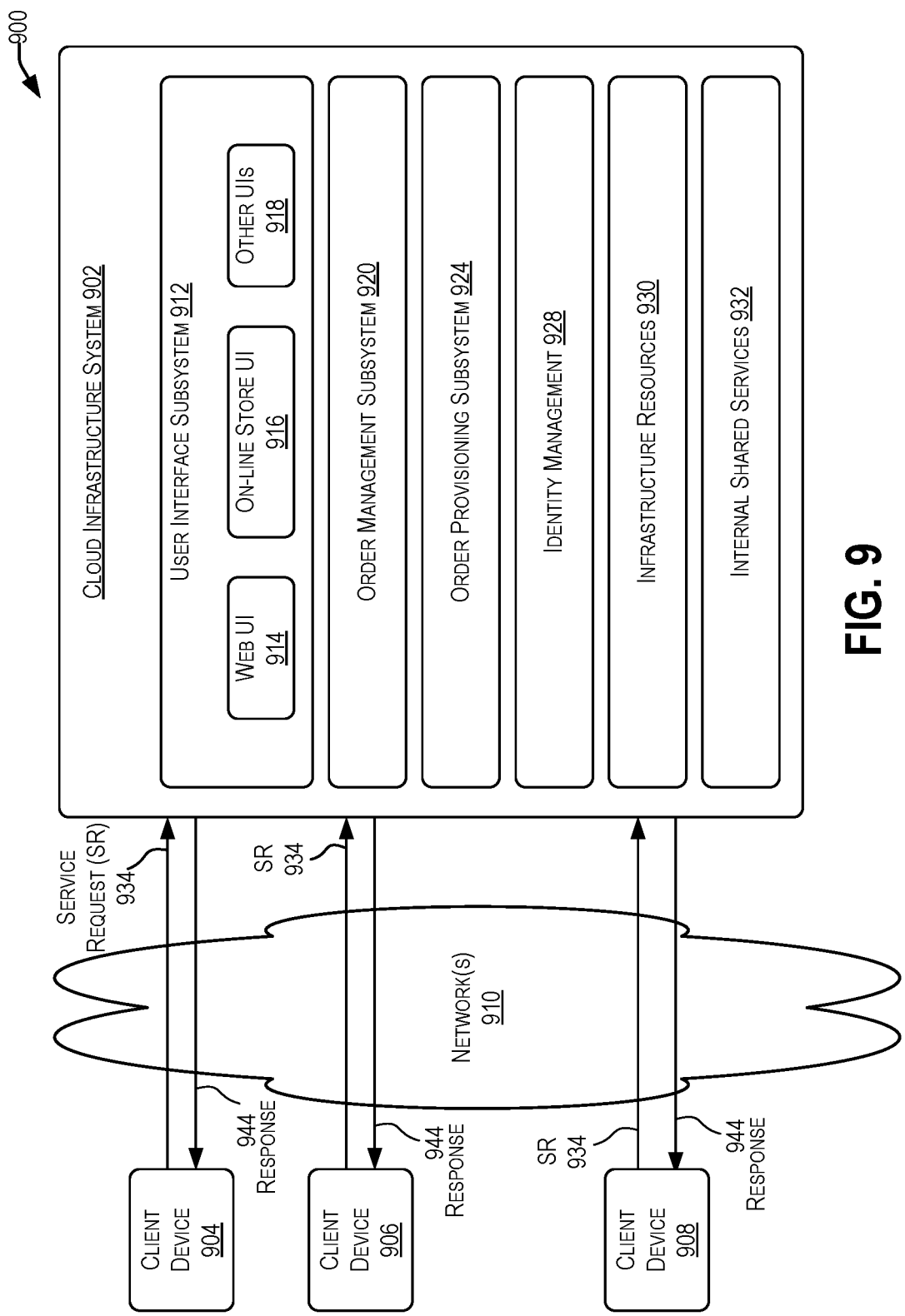
FIG. 9 is a simplified block diagram of a cloud-based system environment in which functionalities described herein may be offered as cloud services, in accordance with certain embodiments.

FIG. 9 is a simplified block diagram of a cloud-based system environment in which functionalities described herein may be offered as cloud services, in accordance with certain embodiments. In the embodiment depicted in FIG. 9, cloud infrastructure system 902 may provide one or more cloud services that may be requested by users using one or more client computing devices 904, 906, and 908. Cloud infrastructure system 902 may comprise one or more computers and/or servers that may include those described above for server 912. The computers in cloud infrastructure system 902 may be organized as general purpose computers, specialized server computers, server farms, server clusters, or any other appropriate arrangement and/or combination.

Network(s) 910 may facilitate communication and exchange of data between clients 904, 906, and 908 and cloud infrastructure system 902. Network(s) 910 may include one or more networks. The networks may be of the same or different types. Network(s) 910 may support one or more communication protocols, including wired and/or wireless protocols, for facilitating the communications.

The embodiment depicted in FIG. 9 is only one example of a cloud infrastructure system and is not intended to be limiting. It should be appreciated that, in some other embodiments, cloud infrastructure system 902 may have more or fewer components than those depicted in FIG. 9, may combine two or more components, or may have a different configuration or arrangement of components. For example, although FIG. 9 depicts three client computing devices, any number of client computing devices may be supported in alternative embodiments.

The term cloud service is generally used to refer to a service that is made available to users on demand and via a communication network such as the Internet by systems (e.g., cloud infrastructure system 902) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, California, such as middleware services, database services, Java cloud services, and others.

In certain embodiments, cloud infrastructure system 902 may provide one or more cloud services using different models such as under a Software as a Service (SaaS) model, a Platform as a Service (PaaS) model, an Infrastructure as a Service (IaaS) model, and others, including hybrid service models. Cloud infrastructure system 902 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 902. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 902. Cloud infrastructure system 902 then performs processing to provide the services requested in the customer's subscription order. Cloud infrastructure system 902 may be configured to provide one or even multiple cloud services.

Cloud infrastructure system 902 may provide the cloud services via different deployment models. In a public cloud model, cloud infrastructure system 902 may be owned by a third party cloud services provider and the cloud services are offered to any general public customer, where the customer can be an individual or an enterprise. In certain other embodiments, under a private cloud model, cloud infrastructure system 902 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 902 and the services provided may be shared by several organizations in a related community. Various other models such as hybrids of the above mentioned models may also be used.

Client computing devices 904, 906, and 908 may be of different types (such as devices 902, 904, 906, and 908 depicted in FIG. 9) and may be capable of operating one or more client applications. A user may use a client device to interact with cloud infrastructure system 902, such as to request a service provided by cloud infrastructure system 902.

In some embodiments, the processing performed by cloud infrastructure system 902 may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. The data used for this analysis may include structured data (e.g., data stored in a database or structured according to a structured model) and/or unstructured data (e.g., data blobs (binary large objects)).

As depicted in the embodiment in FIG. 9, cloud infrastructure system 902 may include infrastructure resources 930 that are utilized for facilitating the provision of various cloud services offered by cloud infrastructure system 902. Infrastructure resources 930 may include, for example, processing resources, storage or memory resources, networking resources, and the like.

In certain embodiments, to facilitate efficient provisioning of these resources for supporting the various cloud services provided by cloud infrastructure system 902 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 902 may itself internally use services 932 that are shared by different components of cloud infrastructure system 902 and which facilitate the provisioning of services by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 902 may comprise multiple subsystems. These subsystems may be implemented in software, or hardware, or combinations thereof. As depicted in FIG. 9, the subsystems may include a user interface subsystem 912 that enables users or customers of cloud infrastructure system 902 to interact with cloud infrastructure system 902. User interface subsystem 912 may include various different interfaces such as a web interface 914, an online store interface 916 where cloud services provided by cloud infrastructure system 902 are advertised and are purchasable by a consumer, and other interfaces 918. For example, a customer may, using a client device, request (service request 934) one or more services provided by cloud infrastructure system 902 using one or more of interfaces 914, 916, and 918. For example, a customer may access the online store, browse cloud services offered by cloud infrastructure system 902, and place a subscription order for one or more services offered by cloud infrastructure system 902 that the customer wishes to subscribe to. The service request may include information identifying the customer and one or more services that the customer desires to subscribe to.

In certain embodiments, such as the embodiment depicted in FIG. 9, cloud infrastructure system 902 may comprise an order management subsystem (OMS) 920 that is configured to process the new order. As part of this processing, OMS 920 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 920 may then invoke the order provisioning subsystem (OPS) 924 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 924 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 902 may send a response or notification 944 to the requesting customer to indicate when the requested service is now ready for use. In some instances, information (e.g., a link) may be sent to the customer that enables the customer to start using and availing the benefits of the requested services.

Cloud infrastructure system 902 may provide services to multiple customers. For each customer, cloud infrastructure system 902 is responsible for managing information related to one or more subscription orders received from the customer, maintaining customer data related to the orders, and providing the requested services to the customer. Cloud infrastructure system 902 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 902 may provide services to multiple customers in parallel. Cloud infrastructure system 902 may store information for these customers, including possibly proprietary information. In certain embodiments, cloud infrastructure system 902 comprises an identity management subsystem (IMS) 928 that is configured to manage customers information and provide the separation of the managed information such that information related to one customer is not accessible by another customer. IMS 928 may be configured to provide various security-related services such as identity services, such as information access management, authentication and authorization services, services for managing customer identities and roles and related capabilities, and the like.

Figure 10:
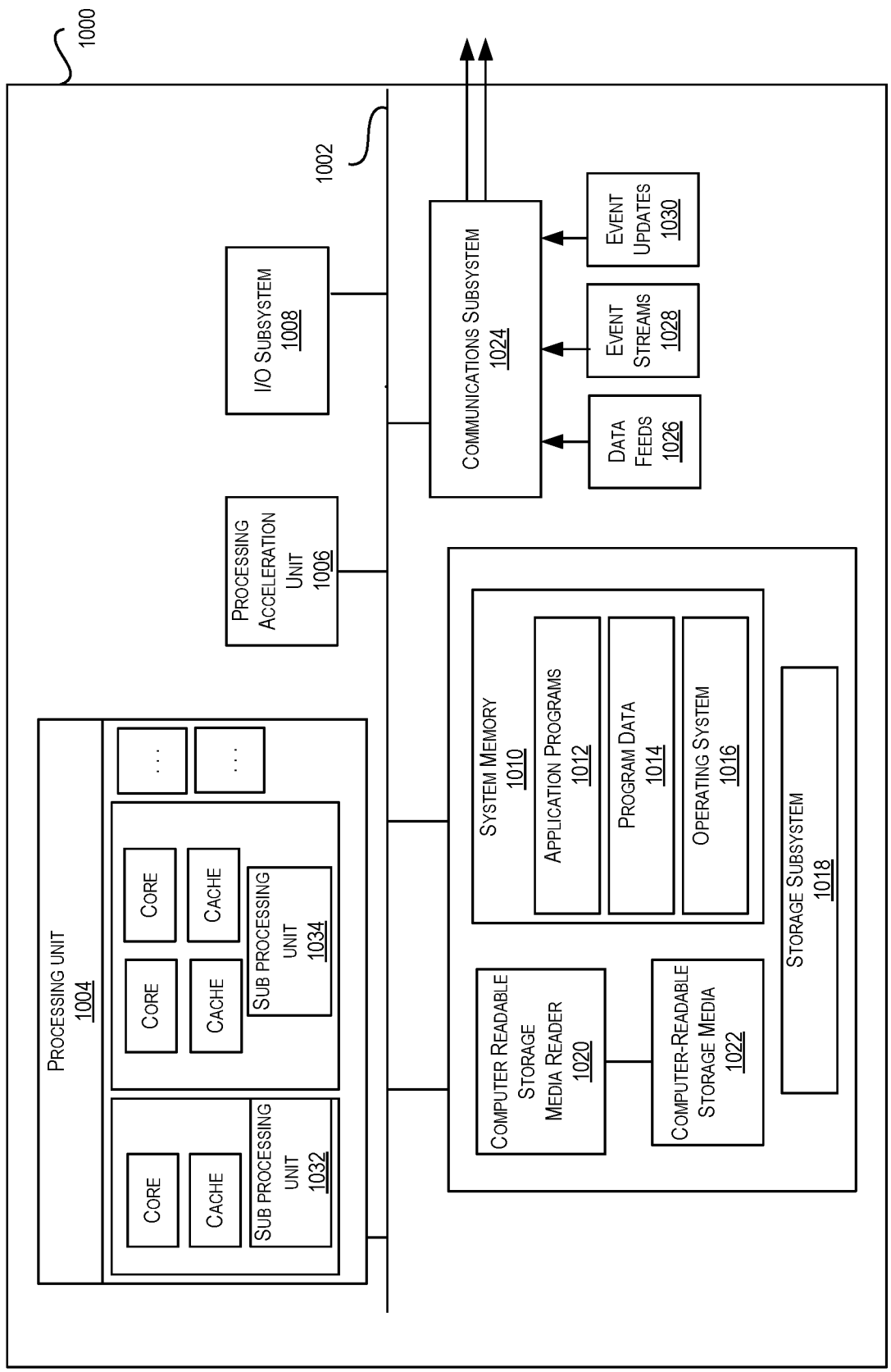
FIG. 10 illustrates an exemplary computer system that may be used to implement certain embodiments.

FIG. 10 illustrates an exemplary computer system 1000 that may be used to implement certain embodiments. For example, in some embodiments, computer system 1000 may be used to implement any of the system and subsystems for performing processing according to the present disclosure. As shown in FIG. 10, computer system 1000 includes various subsystems including a processing subsystem 1004 that communicates with a number of other subsystems via a bus subsystem 1002. These other subsystems may include a processing acceleration unit 1006, an I/O subsystem 1008, a storage subsystem 1018, and a communications subsystem 1024. Storage subsystem 1018 may include non-transitory computer-readable storage media including storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1004 controls the operation of computer system 1000 and may comprise one or more processors, application specific integrated circuits (ASICs), or field programmable gate arrays (FPGAs). The processors may include be single core or multicore processors. The processing resources of computer system 1000 can be organized into one or more processing units 1032, 1034, etc. A processing unit may include one or more processors, one or more cores from the same or different processors, a combination of cores and processors, or other combinations of cores and processors. In some embodiments, processing subsystem 1004 can include one or more special purpose co-processors such as graphics processors, digital signal processors (DSPs), or the like. In some embodiments, some or all of the processing units of processing subsystem 1004 can be implemented using customized circuits, such as application specific integrated circuits (ASICs), or field programmable gate arrays (FPGAs).

In some embodiments, the processing units in processing subsystem 1004 can execute instructions stored in system memory 1010 or on computer readable storage media 1022. In various embodiments, the processing units can execute a variety of programs or code instructions and can maintain multiple concurrently executing programs or processes. At any given time, some or all of the program code to be executed can be resident in system memory 1010 and/or on computer-readable storage media 1022 including potentially on one or more storage devices. Through suitable programming, processing subsystem 1004 can provide various functionalities described above. In instances where computer system 1000 is executing one or more virtual machines, one or more processing units may be allocated to each virtual machine.

In certain embodiments, a processing acceleration unit 1006 may optionally be provided for performing customized processing or for off-loading some of the processing performed by processing subsystem 1004 so as to accelerate the overall processing performed by computer system 1000.

I/O subsystem 1008 may include devices and mechanisms for inputting information to computer system 1000 and/or for outputting information from or via computer system 1000. In general, use of the term input device is intended to include all possible types of devices and mechanisms for inputting information to computer system 1000. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 860 game controller, devices that provide an interface for receiving input using gestures and spoken commands. User interface input devices may also include eye gesture recognition devices such as the Google Glass' blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1000 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1018 provides a repository or data store for storing information and data that is used by computer system 1000. Storage subsystem 1018 provides a tangible non-transitory computer-readable storage medium for storing the basic programming and data constructs that provide the functionality of some embodiments. Storage subsystem 1018 may store software (e.g., programs, code modules, instructions) that when executed by processing subsystem 1004 provides the functionality described above. The software may be executed by one or more processing units of processing subsystem 1004. Storage subsystem 1018 may also provide a repository for storing data used in accordance with the teachings of this disclosure.

Storage subsystem 1018 may include one or more non-transitory memory devices, including volatile and non-volatile memory devices. As shown in FIG. 10, storage subsystem 1018 includes a system memory 1010 and a computer-readable storage media 1022. System memory 1010 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1000, such as during start-up, may typically be stored in the ROM. The RAM typically contains data and/or program modules that are presently being operated and executed by processing subsystem 1004. In some implementations, system memory 1010 may include multiple different types of memory, such as static random access memory (SRAM), dynamic random access memory (DRAM), and the like.

By way of example, and not limitation, as depicted in FIG. 10, system memory 1010 may load application programs 1012 that are being executed, which may include various applications such as Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1022 may store programming and data constructs that provide the functionality of some embodiments. Computer-readable media 1022 may provide storage of computer-readable instructions, data structures, program modules, and other data for computer system 1000. Software (programs, code modules, instructions) that, when executed by processing subsystem 1004 provides the functionality described above, may be stored in storage subsystem 1018. By way of example, computer-readable storage media 1022 may include non-volatile memory such as a hard disk drive, a magnetic disk drive, an optical disk drive such as a CD ROM, DVD, a Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 1018 may also include a computer-readable storage media reader 1020 that can further be connected to computer-readable storage media 1022. Reader 1020 may receive and be configured to read data from a memory device such as a disk, a flash drive, etc.

In certain embodiments, computer system 1000 may support virtualization technologies, including but not limited to virtualization of processing and memory resources. For example, computer system 1000 may provide support for executing one or more virtual machines. In certain embodiments, computer system 1000 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1000. Accordingly, multiple operating systems may potentially be run concurrently by computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to establish a communication channel to one or more client devices via the Internet for receiving and sending information from and to the client devices.

Communication subsystem 1024 may support both wired and/or wireless communication protocols. For example, in certain embodiments, communications subsystem 1024 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

Communication subsystem 1024 can receive and transmit data in various forms. For example, in some embodiments, in addition to other forms, communications subsystem 1024 may receive input communications in the form of structured and/or unstructured data feeds 1026, event streams 1028, event updates 1030, and the like. For example, communications subsystem 1024 may be configured to receive (or send) data feeds 1026 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1024 may be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 1024 may also be configured to communicate data from computer system 1000 to other computer systems or networks. The data may be communicated in various different forms such as structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1000 depicted in FIG. 10 is intended only as a specific example. Many other configurations having more or fewer components than the system depicted in FIG. 10 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims. Various modifications and equivalents include relevant, appropriate combination of features disclosed in the embodiments.

What is claimed is:

1. A computer-implemented method comprising:
    for a text message being composed via an application for an intended recipient, receiving, by a text prediction system, a first portion of the text message based upon a current cursor position in the text message;
    identifying, by the text prediction system, a customer associated with the intended recipient;
    identifying, by the text prediction system, a customer-specific model for the customer;
    predicting, by the text prediction system, text to be suggested for insertion at the current cursor position using the customer-specific model and based upon the first portion of the text message, the suggested text including a first data variable, wherein the first data variable is replaceable with a first value determined from data stored for the customer;
    causing, by the text prediction system, the suggested text including the first data variable to be output via the application, wherein the first data variable is represented by a data variable name in the suggested text;
    for the text message being composed via the application for the intended recipient, receiving, by the text prediction system, a second portion of the text message based upon a new current cursor position in the text message;
    predicting, by the text prediction system, text to be suggested for insertion at the new current cursor position using the customer-specific model and based upon the second portion of the text message, the suggested text including a second data variable, wherein the second data variable is replaceable with a second value determined from data stored for the customer;
    causing, by the text prediction system, the suggested text including the second data variable to be output via the application;
    receiving, by the application, a signal to replace the first data variable in the suggested text with the first value and the second data variable in the suggested text with a second value; and
    causing, by the application, the suggested text including the first value associated with the first variable and the second value associated with the second variable to be output via the application.

2. The computer-implemented method of claim 1, further comprising:
    determining, by the text prediction system, based upon one or more information sources storing the data associated with the customer, the first value for the first data variable in the suggested text; and
    replacing, by the computer system, the first data variable in the suggested text with the first value.

3. The computer-implemented method of claim 2, wherein the causing comprises providing, by the text prediction system to the application, the suggested text with the first data variable replaced with the first value.

4. The computer-implemented method of claim 3, further comprising:
    inserting, by the application, the suggested text with the first data variable replaced with the first value into the text message at the current cursor position.

5. The computer-implemented method of claim 1, further comprising:
    determining, by the text prediction system and based upon one or more information sources storing the data associated with the customer, the first value for the first data variable in the suggested text; and
    wherein the causing comprises providing, by the text prediction system to the application, the suggested text comprising the first data variable and the first value determined for the first variable.

6. The computer-implemented method of claim 5, further comprising;
    receiving, by the application, an indication indicating selection of the suggested text for insertion at the current cursor position;
    causing, by the application, the suggested text to be inserted at the current cursor position;
    receiving, by the application, an indication of selection of the first value; and
    replacing, by the application, the first data variable in the suggested text inserted in the text message with the first value.

7. The computer-implemented method of claim 1, further comprising:
    receiving, by the application, a signal to replace a set of one or more data variables present in the text message with their corresponding data values;
    communicating, by the application, the set of one or more data variables to the text prediction system;
    receiving, by the application and from the text prediction system, a set of values determined by the text prediction system for the set of one or more data variables; and
    for each data variable in the set of one or more data variables, replacing, by the application, the data variable with its corresponding value received by the application from the text prediction system.

8. The computer-implemented method of claim 7, further comprising:
    receiving, by the text prediction system, the set of one or more data variables from the application;
    for each data variable in the set of one or more data variables, determining, by the text prediction system, a value for the data variable using one or more information sources storing data associated with the customer; and
    communicating, by the text prediction system to the application, the set of values determined by the text prediction system for the set of one or more data variables.

9. The computer-implemented method of claim 8, further comprising:

identifying, by the text prediction system, a first particular data acquisition technique to be used to obtain a value for a first particular data variable in the set of one or more data variables;
using, by the text prediction system, the first particular data acquisition technique to determine the value for the first particular data variable.

10. The computer-implemented method of claim 9, further comprising:
identifying, by the text prediction system, a second particular data acquisition technique to be used to obtain a value for a second particular data variable in the set of one or more data variables; and
using, by the text prediction system, the second particular data acquisition technique to determine the value for the second particular data variable, wherein the first particular data acquisition technique is different from the second particular data acquisition technique.

11. The computer-implemented method of claim 8, further comprising:
identifying, by the text prediction system, a first information source, from one or more information sources storing data associated with the customer, for obtaining a value for a first particular data variable in the set of one or more data variables; and
using, by the text prediction system, the first information source to determine the value for the first particular data variable.

12. The computer-implemented method of claim 11, further comprising:
identifying, by the text prediction system, a second information source, from one or more information sources storing data associated with the customer, for obtaining a value for a second particular data variable in the set of one or more data variables; and
using, by the text prediction system, the second information source to determine the value for the second particular data variable, wherein the first data source is different from the second data source.

13. The computer-implemented method of claim 1, wherein the customer-specific model is trained using customer specific data associated with the customer and non-customer specific data.

14. The computer-implemented method of claim 13, wherein the first data variable is generated by a training system used by the text prediction system based at least in part on the customer specific data associated with the customer.

15. The computer-implemented method of claim 13, wherein the customer specific data comprises at least one of company specific terminology and information, product manuals or company specific Frequently Asked Questions (FAQs) associated with the customer.

16. The computer-implemented method of claim 1, wherein the text message comprises an email message, a Short Message Service (SMS) or an editable document composed by a user for the intended recipient.

17. A text prediction system comprising:
a memory; and
one or more processors configured to perform processing comprising:
for a text message being composed via an application for an intended recipient, receiving a first portion of the text message based upon a current cursor position in the text message;
identifying a customer associated with the intended recipient;
identifying a customer-specific model for the customer;
predicting text to be suggested for insertion at the current cursor position using the customer-specific model and based upon the first portion of the text message, the suggested text including a first data variable, wherein the first data variable is replaceable with a first value determined from data stored for the customer;
causing the suggested text including the first data variable to be output via the application, wherein the first data variable is represented by a data variable name in the suggested text;
for the text message being composed via the application for the intended recipient, receiving, by the text prediction system, a second portion of the text message based upon a new current cursor position in the text message;
predicting, by the text prediction system, text to be suggested for insertion at the new current cursor position using the customer-specific model and based upon the second portion of the text message, the suggested text including a second data variable, wherein the second data variable is replaceable with a second value determined from data stored for the customer;
causing, by the text prediction system, the suggested text including the second data variable to be output via the application;
receiving, by the application, a signal to replace the first data variable in the suggested text with the first value and the second data variable in the suggested text with a second value; and
causing, by the application, the suggested text including the first value associated with the first variable and the second value associated with the second variable to be output via the application.

18. The text prediction system of claim 17, further comprising:
determining based upon one or more information sources storing the data associated with the customer, the first value for the first data variable in the suggested text; and
replacing the first data variable in the suggested text with the first value.

19. A non-transitory computer-readable medium having program code that is stored thereon, the program code executable by one or more processing devices for performing operations comprising:
for a text message being composed via an application for an intended recipient, receiving a first portion of the text message based upon a current cursor position in the text message;
identifying a customer associated with the intended recipient;
identifying a customer-specific model for the customer;
predicting text to be suggested for insertion at the current cursor position using the customer-specific model and based upon the first portion of the text message, the suggested text including a first data variable, wherein the first data variable is replaceable with a first value determined from data stored for the customer;
causing the suggested text including the first data variable to be output via the application, wherein the first data variable is represented by a data variable name in the suggested text;
for the text message being composed via the application for the intended recipient, receiving, by the text prediction system, a second portion of the text message based upon a new current cursor position in the text message;

predicting, by the text prediction system, text to be suggested for insertion at the new current cursor position using the customer-specific model and based upon the second portion of the text message, the suggested text including a second data variable, wherein the second data variable is replaceable with a second value determined from data stored for the customer;

causing, by the text prediction system, the suggested text including the second data variable to be output via the application;

receiving, by the application, a signal to replace the first data variable in the suggested text with the first value and the second data variable in the suggested text with a second value; and causing, by the application, the suggested text including the first value associated with the first variable and the second value associated with the second variable to be output via the application.

20. The non-transitory computer-readable medium of claim 19, wherein the text message comprises an email message, a Short Message Service (SMS) or an editable document composed by a user for the intended recipient.

* * * * *